US012707051B2

(12) United States Patent
Gao et al.

(10) Patent No.: US 12,707,051 B2
(45) **Date of Patent: *Aug. 11, 2026**

(54) BOUNDARY BLOCK PARTITIONING IN VIDEO CODING

(71) Applicant: HUAWEI TECHNOLOGIES CO., LTD., Shenzhen (CN)

(72) Inventors: Han Gao, Shenzhen (CN); Jianle Chen, San Diego, CA (US); Semih Esenlik, Munich (DE); Zhijie Zhao, Shenzhen (CN); Anand Meher Kotra, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/023,219

(22) Filed: Jan. 15, 2025

(65) Prior Publication Data

US 2025/0233989 A1 Jul. 17, 2025

Related U.S. Application Data

(63) Continuation of application No. 18/365,830, filed on Aug. 4, 2023, now Pat. No. 12,212,747, which is a (Continued)

(51) Int. Cl.

*H04N 19/119* (2014.01)
*H04N 19/176* (2014.01)

(Continued)

(52) U.S. Cl.

CPC ......... *H04N 19/119* (2014.11); *H04N 19/176* (2014.11); *H04N 19/192* (2014.11); *H04N 19/96* (2014.11)

(58) Field of Classification Search

None

See application file for complete search history.

(56) References Cited

U.S. PATENT DOCUMENTS 8,761,245 B2 6/2014 Puri et al.
11,425,375 B2 * 8/2022 Gao .................... H04N 19/119

(Continued)

FOREIGN PATENT DOCUMENTS

CN 103329529 A 9/2013
CN 103430545 A 12/2013

(Continued)

OTHER PUBLICATIONS

Li et al., "Multi-Type-Tree," Joint Video Exploration Team (JVET) of ITU-T SG 16 WP 3 and ISO/IEC JTC 1/SC 29/WG 11, 4th Meeting: Chengdu, CN, Document: JVET-D0117r1, pp. 1-3 (Oct. 15-21, 2016).

(Continued)

*Primary Examiner* — Kaitlin A Retallick

(74) *Attorney, Agent, or Firm* — Leydig, Voit & Mayer, Ltd.

(57) ABSTRACT

A partitioning method comprises determining whether a current block of a picture is a boundary block and whether the size of the current block is larger than a minimum allowed quadtree leaf node size; and if the current block is the boundary block and the size of the current block is not larger than the minimum allowed quadtree leaf node size (MinQTSize), applying forced binary tree (BT) partitioning to the current block. A method comprises making a determination that a current block of a picture is a boundary block and that a size of the current block is less than or equal to a minimum allowed quadtree (QT) leaf node size (MinQTSize); and applying, in response to the determination, forced binary tree (BT) partitioning to the current block.

9 Claims, 13 Drawing Sheets

Related U.S. Application Data continuation of application No. 17/876,317, filed on Jul. 28, 2022, now Pat. No. 11,750,810, which is a continuation of application No. 17/144,976, filed on Jan. 8, 2021, now Pat. No. 11,425,375, which is a continuation of application No. PCT/CN2019/093396, filed on Jun. 27, 2019.

(60) Provisional application No. 62/818,996, filed on Mar. 15, 2019, provisional application No. 62/697,274, filed on Jul. 12, 2018.

(51) Int. Cl.
*H04N 19/192* (2014.01)
*H04N 19/96* (2014.01)

(56) References Cited

U.S. PATENT DOCUMENTS

| | | | | |
|---|---|---|---|---|
| 11,750,810 | B2 * | 9/2023 | Gao | H04N 19/119 375/240.02 |
| 12,212,747 | B2 * | 1/2025 | Gao | H04N 19/119 |
| 2014/0254661 | A1 | 9/2014 | Saxena et al. | |
| 2017/0208336 | A1 | 7/2017 | Li et al. | |
| 2017/0272750 | A1 | 9/2017 | An et al. | |
| 2017/0347128 | A1 * | 11/2017 | Panusopone | H04N 19/174 |
| 2019/0075328 | A1 * | 3/2019 | Huang | H04N 19/70 |
| 2019/0246106 | A1 | 8/2019 | Park et al. | |
| 2020/0077094 | A1 * | 3/2020 | Poirier | H04N 19/119 |
| 2020/0389653 | A1 | 12/2020 | Jang | |

FOREIGN PATENT DOCUMENTS

| | | | |
|---|---|---|---|
| CN | 104247424 | A | 12/2014 |
| CN | 105308956 | A | 2/2016 |
| CN | 107005718 | A | 8/2017 |
| CN | 107431815 | A | 12/2017 |
| CN | 107566848 | A | 1/2018 |
| CN | 107836117 | A | 3/2018 |
| CN | 110024388 | A | 7/2019 |
| EP | 3506632 | A1 | 7/2019 |
| JP | 2018085660 | A | 5/2018 |
| JP | 2019535204 | A | 12/2019 |
| JP | 2021500718 | A | 1/2021 |
| KR | 20190038910 | A | 4/2019 |
| RU | 2589341 | C2 | 7/2016 |
| WO | 2016090568 | A1 | 6/2016 |
| WO | 2016091161 | A1 | 6/2016 |
| WO | 2017123980 | A1 | 7/2017 |
| WO | 2017157249 | A1 | 9/2017 |
| WO | 2018038492 | A1 | 3/2018 |
| WO | 2018064948 | A1 | 4/2018 |
| WO | 2018070550 | A1 | 4/2018 |

OTHER PUBLICATIONS

Gao et al., "CE1-2.0.11: Picture Boundary Handling," Joint Video Experts Team (JVET) of ITU-T SG 16 WP 3 and ISO/IEC JTC 1/SC 29/WG 11, 11th Meeting: Ljubljana, SI, Document: JVET-K0287-v1, Total 7 pages, Geneva, Switzerland (Jul. 10-18, 2018).

Huang et al., "EE2.1: Quadtree plus binary tree structure integration with JEM tools," Joint Video Exploration Team of ITU-T SG 16 WP 3 and ISO/IEC JTC 1/SC 29/WG 11, 3rd Meeting: Geneva, Ch, JVET-C0024 version 2, Released on May 25, 2016, Total 5 pages, International Union of Telecommunication, Geneva, Switzerland (May 26-Jun. 1, 2016).

Chen et al., "Description of SDR, HDR and 360° video coding technology proposal by Huawei, GoPro, HiSilicon, and Samsung," buJoint Video Exploration Team (JVET) of ITU-T SG 16 WP 3 and ISO/IEC JTC 1/SC 29/WG 11, 10th Meeting: San Diego, US, Document: JVET-J0025-v2, Total 132 pages, Geneva, Switzerland (Apr. 10-20, 2018).

Bross et al., "Versatile Video Coding (Draft 2)," Joint Video Experts Team (JVET) of ITU-T SG 16 WP 3 and ISO/IEC JTC 1/SC 29/WG 11, 11th Meeting: Ljubljana, SI, Document: JVET-K1001-v4, Total 85 pages (Jul. 10-18, 2018).

Hsiang et al., "CE1.2.0.10: Cu partitioning along picture boundaries," Joint Video Experts Team (JVET) of ITU-T SG 16 WP 3 and ISO/IEC JTC 1/SC 29/WG11, 11th Meeting: Ljubljana, SI, JVET-K0224-v1, total 4 pages (Jul. 10-18, 2018).

Bross et al., "Versatile Video Coding (Draft 1)," Joint Video Experts Team (JVET) of ITU-T SG 16 WP 3 and ISO/IEC JTC 1/SC29/WG11, 10th Meeting: San Diego, US, JVET-J1001-v1, total 40 pages (Apr. 10-20, 2018).

Hsu et al., "Description of SDR video coding technology proposal by MediaTek," Joint Video Experts Team (JVET) of ITU-T SG 16 WP 3 and ISO/IEC JTC 1/SC 29/WG11, 10th Meeting: San Diego, US, JVET-J0018, total 64 pages (Apr. 10-20, 2018).

Chen et al., "Algorithm description for Versatile Video Coding and Test Model 2 (VTM 2)," Joint Video Experts Team (JVET) of ITU-T SG1 6 WP 3 and ISO/IEC JTC 1/SC 29/WG11, 11th Meeting: Ljubljana, SI, JVET-K1002-v2, total 22 pages (Jul. 10-18, 2018).

Chen et al., "Algorithm description for Versatile Video Coding and Test Model 2 (VTM 2)," Joint Video Experts Team (JVET) of ITU-T SG 16 WP 3 and ISO/IEC JTC 1/SC 29/WG 11, 11th Meeting: Ljubljana, SI, JVET-K1002-v1, pp. 1-15 (Aug. 9, 2018) (available at: https://jvet-experts.org/doc_end_user/current_document.php?id=4117).

Chen et al., "Algorithm description for Versatile Video Coding and Test Model 2 (VTM 2)," Joint Video Experts Team (JVET) of ITU-T SG 16 WP 3 and ISO/IEC JTC 1/SC 29/WG 11, 11th Meeting: Ljubljana, SI, JVET-K1002-v2, pp. 1-21 (Oct. 2, 2018) (available at: https://jvet-experts.org/doc_end_user/current_document.php?id=4117).

Korean Patent Application No. 10-2018-0076750, as filed on Jul. 2, 2018.

English translation of Korean Patent Application No. 10-2018-0076750, as filed on Jul. 2, 2018.

Misra et al., "Description of SDR and HDR video coding technology proposal by Sharp and Foxconn," Joint Video Exploration Team (JVET) of ITU-T SG 16 WP 3 and ISO/IEC JTC 1/SC 29/WG 11, 10th Meeting: San Diego, US, Document: JVET-J0026r1, total 70 pages (Apr. 10-20, 2018).

Ma et al., "Quadtree plus binary tree with shifting (including software)," Joint Video Exploration Team (JVET) of ITU-T SG 16 WP 3 and ISO/IEC JTC 1/SC 29/WG 11, 10th Meeting: San Diego, US, JVET-J0035v4, total 23 pages (Apr. 10- 20, 2018).

P. Bordes et al., "Description of SDR, HDR and 360° video coding technology proposal by Qualcomm and Technicolor—medium complexity version," Joint Video Experts Team (JVET) of ITU-T SG 16 WP 3 and ISO/IEC JTC 1/SC 29/WG 11, 10th Meeting: San Diego, US, JVET-J0022r1, total 84 pages (Apr. 10-20, 2018).

Yang et al., "CTB splitting on frame boundary for arbitrary resolution video," Joint Collaborative Team on Video Coding (JCT-VC) of ITU-T SG16 WP3 and ISO/IEC JTC1/SC29/WG11, 3rd Meeting: Guangzhou, CN, Document: JCTVC-C025, WG11 No. m18036, Total 4 pages, International Union of Telecommunication, Geneva, Switzerland (Oct. 7-15, 2010).

Chen et al., "Algorithm description for Versatile Video Coding and Test Model 1 (VTM 1)," Joint Video Experts Team (JVET) of ITU-T SG 16 WP 3 and ISO/IEC JTC 1/SC 29/WG 11,10th Meeting: San Diego, US, JVET-J1002-v2, total 10 pages (Apr. 10-20, 2018).

Ma et al., "Description of Core Experiment 1 (CE 1): Partitioning," Joint Video Exploration Team (JVET) of ITU-T SG 16 WP 3 and ISO/IEC JTC 1/SC 29/WG 11, 10th Meeting: San Diego, US, JVET-J1021, total 30 pages (Apr. 10-20, 2018).

Ma et al., "CE1: QTBTS partitioning and boundary handling (1.0.5, 1.0.6, 1.0.7, 1.0.8, 2.0.7)," Joint Video Experts Team (JVET) of ITU-T SG 16 WP 3 and ISO/IEC JTC 1/SC 29/WG 11, 11th Meeting: Ljubljana, SI, JVET-K0280-v2, total 5 pages (Jul. 10-18, 2018).

(56) References Cited

OTHER PUBLICATIONS

Li et al., "CE1-2.0.9: Picture Boundary Handling," Joint Video Experts Team (JVET) of ITU-T SG 16 WP 3 and ISO/IEC JTC 1/SC 29/WG 11, 11th Meeting: Ljubljana, SI, JVET-K0376-v1, total 4 pages (Jul. 10-18, 2018).

"Series H: Audiovisual and Multimedia Systems, infrastructure of audiovisual services—transmission multiplexing and synchronization, multiplexing protocol for low bit rate multimedia communication," ITU-T Recommendation H.223, International Telecommunication Union, total 74 pages, International Union of Telecommunication, Geneva, Switzerland (Jul. 2021).

"Series H: Audiovisual and Multimedia Systems, infrastructure of audiovisual services—coding of moving video, video coding for low bit rate communication," ITU-T Recommendation H.263, International Telecommunication Union, total 226 pages, International Union of Telecommunication, Geneva, Switzerland (Jan. 2005).

"Series H: Audiovisual and Multimedia Systems, infrastructure of audiovisual services—coding of moving video, advanced video coding for generic audiovisual services," Recommendation ITU-T H.264, International Telecommunication Union, total 812 pages, International Union of Telecommunication, Geneva, Switzerland (Apr. 2017).

Series H: Audiovisual and Multimedia Systems, infrastructure of audiovisual services—coding of moving video, high efficiency video coding, Recommendation ITU-T H.265, International Telecommunication Union, total 634 pages, International Union of Telecommunication, Geneva, Switzerland (Apr. 2015).

* cited by examiner

BOUNDARY BLOCK PARTITIONING IN VIDEO CODING

CROSS-REFERENCE TO RELATED APPLICATIONS

This application is a continuation of U.S. patent application Ser. No. 18/365,830, filed on Aug. 4, 2023, which is a continuation of U.S. patent application Ser. No. 17/876,317, filed on Jul. 28, 2022 (now U.S. Pat. No. 11,750,810), which is a continuation of U.S. patent application Ser. No. 17/144,976, filed on Jan. 8, 2021 (now U.S. Pat. No. 11,425,375), which is a continuation of International Application No. PCT/CN2019/093396, filed on Jun. 27, 2019, which claims priority to U.S. Provisional Patent Application No. 62/697,274, filed on Jul. 12, 2018, and U.S. Provisional Patent Application No. 62/818,996, filed on Mar. 15, 2019. All of the afore-mentioned patent applications are hereby incorporated by reference in their entireties.

TECHNICAL FIELD

Embodiments of the present application generally relate to the field of video coding and more particularly to coding unit splitting and partitioning.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

Embodiments of the present application (or the present disclosure) provide apparatuses and methods for encoding and decoding.

A first aspect relates to a partitioning method comprising determining whether a current block of a picture is a boundary block and whether the size of the current block is larger than a minimum allowed quadtree leaf node size; and if the current block is the boundary block and the size of the current block is not larger than the minimum allowed quadtree leaf node size (MinQTSize), applying forced binary tree (BT) partitioning to the current block.

In a first implementation form of the method according to the first aspect as such, the forced binary tree partitioning is a recursive horizontal forced binary partitioning in case the current block is located on a bottom boundary of the picture or a recursive vertical forced boundary partitioning in case the current block is located on a right boundary of the picture.

In a second implementation form of the method according to the first aspect as such or any preceding implementation form of the first aspect, the forced binary tree partitioning is continued until a leaf node block is within the picture.

In a third implementation form of the method according to the first aspect as such or any preceding implementation form of the first aspect, the forced binary partitioning comprises recursively partitioning the current block by a horizontal forced boundary partitioning until a sub-partition of the current block is located at the bottom boundary of the picture; and recursively partitioning the sub-partition by a vertical forced boundary partitioning until a leaf node is entirely located at the right boundary of the picture.

In a fourth implementation form of the method according to the first aspect as such or any preceding implementation form of the first aspect, the forced BT partitioning comprises recursively partitioning the current block by a vertical forced boundary partitioning until a sub-partition of the current block is located at the bottom boundary; and recursively partitioning the sub-partition by a horizontal forced boundary partitioning until a leaf node is entirely located at the right boundary.

In a fifth implementation form of the method according to the first aspect as such or any preceding implementation form of the first aspect, the method further comprises applying the minimum allowed quadtree leaf node size for controlling a partitioning of a non-boundary block.

In a sixth implementation form of the method according to the first aspect as such or any preceding implementation form of the first aspect, the boundary block is a block which is not completely inside the picture and not completely outside the picture.

A second aspect relates to a decoding method for decoding a block by partitioning the block according to the first aspect as such or any preceding implementation form of the first aspect.

In a first implementation form of the method according to the second aspect as such, the method further comprises receiving the minimum allowed quadtree leaf node size via a sequence parameter set (SPS).

A third aspect relates to an encoding method for encoding a block by partitioning the block according to the first aspect as such or any preceding implementation form of the first aspect.

In a first implementation form of the method according to the third aspect as such, the method further comprises transmitting the minimum allowed quadtree leaf node size via a sequence parameter set (SPS).

A fourth aspect relates to a decoding device comprising logic circuitry configured to decode a block by partitioning the block according to the partitioning method of the first aspect as such or any preceding implementation form of the first aspect.

In a first implementation form of the decoding device according to the fourth aspect as such, the logic circuitry is further configured to receive the minimum allowed quadtree leaf node size via a sequence parameter set (SPS).

A fifth aspect relates to an encoding device comprising logic circuitry configured to encode a block by partitioning the block according to the partitioning method of the first aspect as such or any preceding implementation form of the first aspect.

In a first implementation form of the decoding device according to the fifth aspect as such, the logic circuitry is further configured to transmit the minimum allowed quadtree leaf node size via a sequence parameter set (SPS).

A sixth aspect relates to a non-transitory storage medium for storing instructions that when executed by a processor cause a processor to perform any of the first, second, or third aspect as such or any preceding implementation form of the first, second, or third aspect.

A seventh aspect relates to a method comprising making a determination that a current block of a picture is a boundary block and that a size of the current block is less than or equal to a minimum allowed quadtree (QT) leaf node size (MinQTSize); and applying, in response to the determination, forced binary tree (BT) partitioning to the current block.

In a first implementation form of the method according to the seventh aspect as such, the current block is located on a bottom boundary of the picture, and wherein the forced BT partitioning is a recursive horizontal forced BT partitioning.

In a second implementation form of the method according to the seventh aspect as such or any preceding implementation form of the seventh aspect, the current block is located on a right boundary of the picture, and wherein the forced BT partitioning is a recursive vertical forced BT partitioning.

In a third implementation form of the method according to the seventh aspect as such or any preceding implementation form of the seventh aspect, the forced BT partitioning comprises recursively partitioning the current block by a horizontal forced boundary partitioning until a sub-partition of the current block is located at the bottom boundary; and recursively partitioning the sub-partition by a vertical forced boundary partitioning until a leaf node is entirely located at the right boundary.

In a fourth implementation form of the method according to the seventh aspect as such or any preceding implementation form of the seventh aspect, the forced BT partitioning comprises recursively partitioning the current block by a vertical forced boundary partitioning until a sub-partition of the current block is located at the bottom boundary; and recursively partitioning the sub-partition by a horizontal forced boundary partitioning until a leaf node is entirely located at the right boundary.

In a fifth implementation form of the method according to the seventh aspect as such or any preceding implementation form of the seventh aspect, the method further comprises applying MinQTSize for controlling partitioning of a non-boundary block.

In a sixth implementation form of the method according to the seventh aspect as such or any preceding implementation form of the seventh aspect, the method further comprises receiving MinQTSize via a sequence parameter set (SPS).

In a seventh implementation form of the method according to the seventh aspect as such or any preceding implementation form of the seventh aspect, the method further comprises transmitting MinQTSize via a sequence parameter set (SPS).

An eighth aspect relates to an apparatus comprising a memory; and a processor coupled to the memory and configured to determine whether a current block of a picture is a boundary block, determine, when the current block is a boundary block, whether a size of the current block is larger than a minimum allowed quadtree (QT) leaf node size (MinQTSize), and apply, when the size of the current block is not larger than MinQTSize, forced binary tree (BT) partitioning to the current block.

In a first implementation form of the apparatus according to the eighth aspect as such, the forced BT partitioning is a recursive horizontal forced BT partitioning when the current block is located on a bottom boundary of the picture or a recursive vertical forced BT partitioning when the current block is located on a right boundary of the picture.

In a second implementation form of the apparatus according to the eighth aspect as such or any preceding implementation form of the eighth aspect, the forced BT partitioning comprises recursively partitioning the current block by a horizontal forced boundary partitioning until a sub-partition of the current block is located at the bottom boundary; and recursively partitioning the sub-partition by a vertical forced boundary partitioning until a leaf node is entirely located at the right boundary.

In a third implementation form of the apparatus according to the eighth aspect as such or any preceding implementation form of the eighth aspect, the forced BT partitioning comprises recursively partitioning the current block by a vertical forced boundary partitioning until a sub-partition of the current block is located at the bottom boundary; and recursively partitioning the sub-partition by a horizontal forced boundary partitioning until a leaf node is entirely located at the right boundary.

In a fourth implementation form of the apparatus according to the eighth aspect as such or any preceding implementation form of the eighth aspect, the processor is further configured to apply MinQTSize for controlling partitioning of a non-boundary block.

In a fifth implementation form of the apparatus according to the eighth aspect as such or any preceding implementation form of the eighth aspect, the apparatus further comprises a receiver coupled to the processor and configured to receive MinQTSize via a sequence parameter set (SPS).

In a sixth implementation form of the apparatus according to the eighth aspect as such or any preceding implementation form of the eighth aspect, the apparatus further comprises a transmitter coupled to the processor and configured to transmit MinQTSize via a sequence parameter set (SPS).

A ninth aspect relates to a computer program product comprising computer executable instructions stored on a non-transitory medium that when executed by a processor cause an apparatus to determine whether a current block of a picture is a boundary block; determine, when the current block is a boundary block, whether a size of the current block is larger than a minimum allowed quadtree (QT) leaf node size (MinQTSize); and apply, when the size of the current block 0 is not larger than MinQTSize, forced binary tree (BT) partitioning to the current block.

In a first implementation form of the apparatus according to the eighth aspect as such, the forced BT partitioning is a recursive horizontal forced BT partitioning when the current block is located on a bottom boundary of the picture or a recursive vertical forced BT partitioning when the current block is located on a right boundary of the picture.

In a second implementation form of the apparatus according to the ninth aspect as such or any preceding implementation form of the ninth aspect, the forced BT partitioning comprises recursively partitioning the current block by a horizontal forced boundary partitioning until a sub-partition of the current block is located at the bottom boundary; and recursively partitioning the sub-partition by a vertical forced boundary partitioning until a leaf node is entirely located at the right boundary.

In a third implementation form of the apparatus according to the ninth aspect as such or any preceding implementation form of the ninth aspect, the forced BT partitioning comprises recursively partitioning the current block by a vertical forced boundary partitioning until a sub-partition of the current block is located at the bottom boundary; and recursively partitioning the sub-partition by a horizontal forced boundary partitioning until a leaf node is entirely located at the right boundary.

In a fourth implementation form of the apparatus according to the ninth aspect as such or any preceding implementation form of the ninth aspect, the instructions further cause the apparatus to apply MinQTSize for controlling partitioning of a non-boundary block.

In a fifth implementation form of the apparatus according to the ninth aspect as such or any preceding implementation form of the ninth aspect, the instructions further cause the apparatus to receive MinQTSize via a sequence parameter set (SPS).

In a sixth implementation form of the apparatus according to the ninth aspect as such or any preceding implementation form of the ninth aspect, the instructions further cause the apparatus to transmit MinQTSize via a sequence parameter set (SPS).

For the purpose of clarity, any one of the embodiments disclosed herein may be combined with any one or more of the other embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1A:
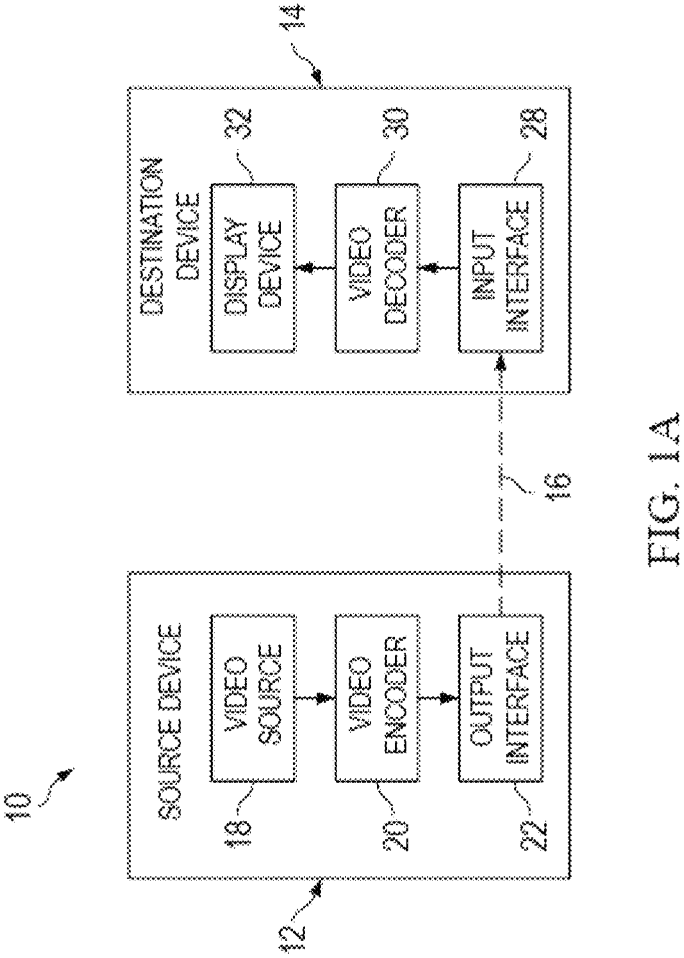
FIG. 1A is a block diagram illustrating an example coding system that may implement embodiments of the disclosure.

FIG. 1A is a block diagram illustrating an example coding system 10, for example a video coding system 10, that may implement embodiments of the disclosure. The coding system 10 may utilize prediction techniques, e.g. bidirectional prediction techniques. As shown in FIG. 1A, the coding system 10 includes a source device 12 that provides encoded video data to be decoded at a later time by a destination device 14. In particular, the source device 12 may provide the video data to the destination device 14 via a computer-readable medium 16. The source device 12 and the destination device 14 may comprise or be any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device 12 and the destination device 14 may be equipped for wireless communication.

The destination device 14 may receive the encoded video data to be decoded via the computer-readable medium 16. The computer-readable medium 16 may comprise any type of medium or device capable of moving the encoded video data from the source device 12 to the destination device 14. In one example, the computer-readable medium 16 may comprise a communication medium to enable the source device 12 to transmit encoded video data directly to the destination device 14 in real time. The encoded video data may be modulated according to a communication standard, such as a wireless communication protocol, and transmitted to the destination device 14. The communication medium may comprise any wireless or wired communication medium such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some examples, encoded data may be output from an output interface 22 to a storage device. Similarly, encoded data may be accessed from the storage device by an input interface 28. The storage device may include any of a variety of distributed or locally accessed data storage media such as a hard drive, Blu-ray discs, digital video disks (DVD)s, Compact Disc Read-Only Memories (CD-ROMs), flash memory, volatile or non-volatile memory, or any other suitable digital storage media for storing encoded video data. In a further example, the storage device may correspond to a file server or another intermediate storage device that may store the encoded video generated by the source device 12. The destination device 14 may access stored video data from the storage device via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. The destination device 14 may access the encoded video data through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, the coding system 10 may be configured to support one-way or two-way video transmission to support applications such as video streaming, video playback, video broadcasting, and/or video telephony.

In the example of FIG. 1A, the source device 12 includes a video source 18, a video encoder 20, and the output interface 22. The destination device 14 includes input the interface 28, a video decoder 30, and a display device 32. In accordance with this disclosure, video encoder 20 of source device 12 and/or the video decoder 30 of the destination device 14 may be configured to apply the techniques for prediction, e.g. bidirectional prediction. In other examples, the source device 12 and the destination device 14 may include other components or arrangements. For example, the source device 12 may receive video data from an external video source such as an external camera. Likewise, the destination device 14 may interface with an external display device, rather than including an integrated display device.

The illustrated coding system 10 of FIG. 1A is merely one example. Techniques for prediction, e.g. bidirectional prediction, may be performed by any digital video encoding and/or decoding device. Although the techniques of this disclosure generally are performed by a video coding device, the techniques may also be performed by a video encoder/decoder, typically referred to as a "CODEC." Moreover, the techniques of this disclosure may also be performed by a video preprocessor. The video encoder and/or the decoder may be a graphics processing unit (GPU) or a similar device.

The source device 12 and the destination device 14 are merely examples of such coding devices in which the source device 12 generates coded video data for transmission to the destination device 14. In some examples, the source device 12 and the destination device 14 may operate in a substantially symmetrical manner such that each of the source device 12 and the destination device 14 include video encoding and decoding components. Hence, coding system 10 may support one-way or two-way video transmission between video devices 12, 14, e.g., for video streaming, video playback, video broadcasting, or video telephony.

The video source 18 of source device 12 may include a video capture device such as a video camera, a video archive containing previously captured video, and/or a video feed interface to receive video from a video content provider. As a further alternative, the video source 18 may generate computer-graphics-based data as the source video or a combination of live video, archived video, and computer-generated video.

In some cases, when the video source 18 is a video camera, the source device 12 and the destination device 14 may form so-called camera phones or video phones. As mentioned above, however, the techniques described in this disclosure may be applicable to video coding in general and may be applied to wireless and/or wired applications. In each case, the captured, pre-captured, or computer-generated video may be encoded by the video encoder 20. The encoded video information may then be output by the output interface 22 onto the computer-readable medium 16.

The computer-readable medium 16 may include transient media such as a wireless broadcast or wired network transmission, or the computer-readable medium 16 may include non-transitory storage media such as a hard disk, flash drive, compact disc, digital video disc, Blu-ray disc, or other computer-readable media. In some examples, a network server (not shown) may receive encoded video data from the source device 12 and provide the encoded video data to the destination device 14, e.g., via network transmission. Similarly, a computing device of a medium production facility, such as a disc stamping facility, may receive encoded video data from the source device 12 and produce a disc containing the encoded video data. Therefore, the computer-readable medium 16 may be understood to include one or more computer-readable media of various forms, in various examples.

The input interface 28 of destination device 14 receives information from the computer-readable medium 16. The information of computer-readable medium 16 may include syntax information defined by the video encoder 20, which is also used by the video decoder 30, that includes syntax elements that describe characteristics and/or processing of blocks and other coded units, e.g., group of pictures (GOPs). The display device 32 displays the decoded video data to a user and may comprise any of a variety of display devices such as a cathode ray tube (CRT), a liquid crystal display (LCD), a plasma display, an organic light emitting diode (OLED) display, or another type of display device.

The video encoder 20 and the video decoder 30 may operate according to a video coding standard such as the High Efficiency Video Coding (HEVC) standard presently under development, and may conform to the HEVC Test Model (HM). Alternatively, the video encoder 20 and the video decoder 30 may operate according to other proprietary or industry standards such as the International Telecommunications Union Telecommunication Standardization Sector (ITU-T) H.264 standard, alternatively referred to as Motion Picture Expert Group (MPEG)-4, Part 10, Advanced Video Coding (AVC), H.265/HEVC, the Versatile Video Coding (VVC) draft standard currently in development by ITU-T and MPEG, or extensions of such standards. The techniques of this disclosure, however, are not limited to any particular coding standard. Other examples of video coding standards include MPEG-2 and ITU-T H.263. Although not shown in FIG. 1A, in some aspects, the video encoder 20 and the video decoder 30 may each be integrated with an audio encoder and decoder and may include appropriate multiplexer-demultiplexer (MUX-DEMUX) units or other hardware and software to handle encoding of both audio and video in a common data stream or separate data streams. If applicable, MUX-DEMUX units may conform to the ITU-T H.223 multiplexer protocol or other protocols such as the user datagram protocol (UDP).

The video encoder 20 and the video decoder 30 each may be implemented as any of a variety of suitable encoder or decoder circuitry, or in general logic circuitry or coder circuitry, such as one or more microprocessors, digital signal processors (DSPs), application specific integrated circuits (ASICs), field programmable gate arrays (FPGAs), discrete logic, Graphical processing units (GPU), processors (e.g. programmable, e.g. software programmable), software, hardware, firmware or any combinations thereof. When the techniques are implemented partially in software, a device may store instructions for the software in a suitable non-transitory, computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (CODEC) in a respective device. A device including the video encoder 20 and/or the video decoder 30 may comprise an integrated circuit, a microprocessor, and/or a wireless communication device such as a cellular telephone.

Figure 1B:
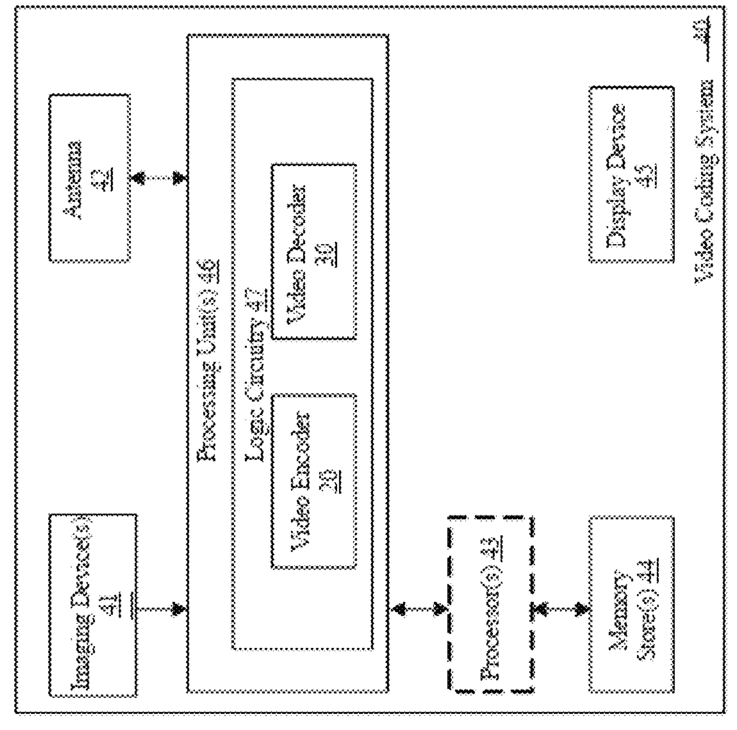
FIG. 1B is a block diagram illustrating another example coding system that may implement embodiments of the disclosure.
Figure 2:
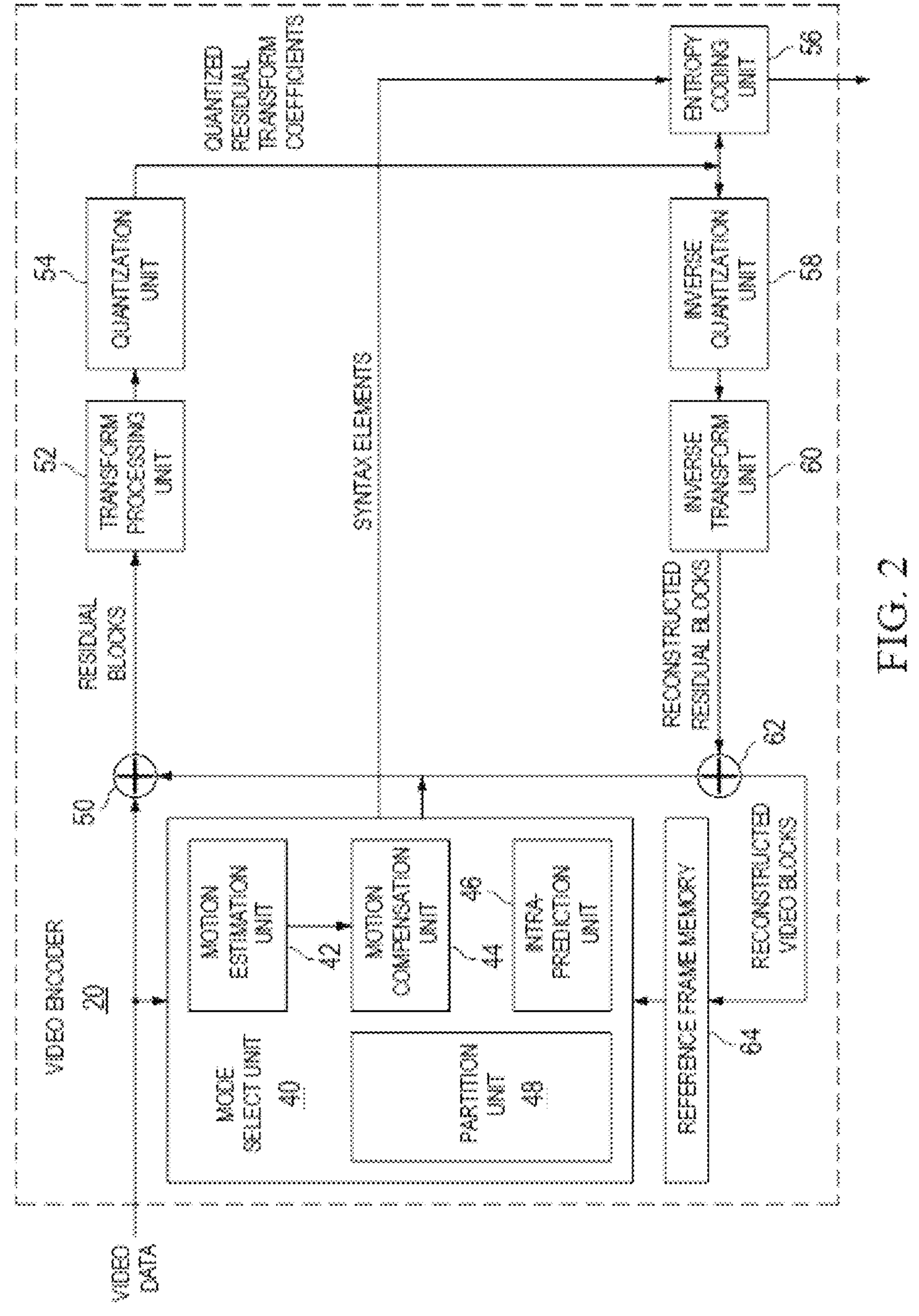
FIG. 2 is a block diagram illustrating an example video encoder that may implement embodiments of the disclosure.
Figure 3:
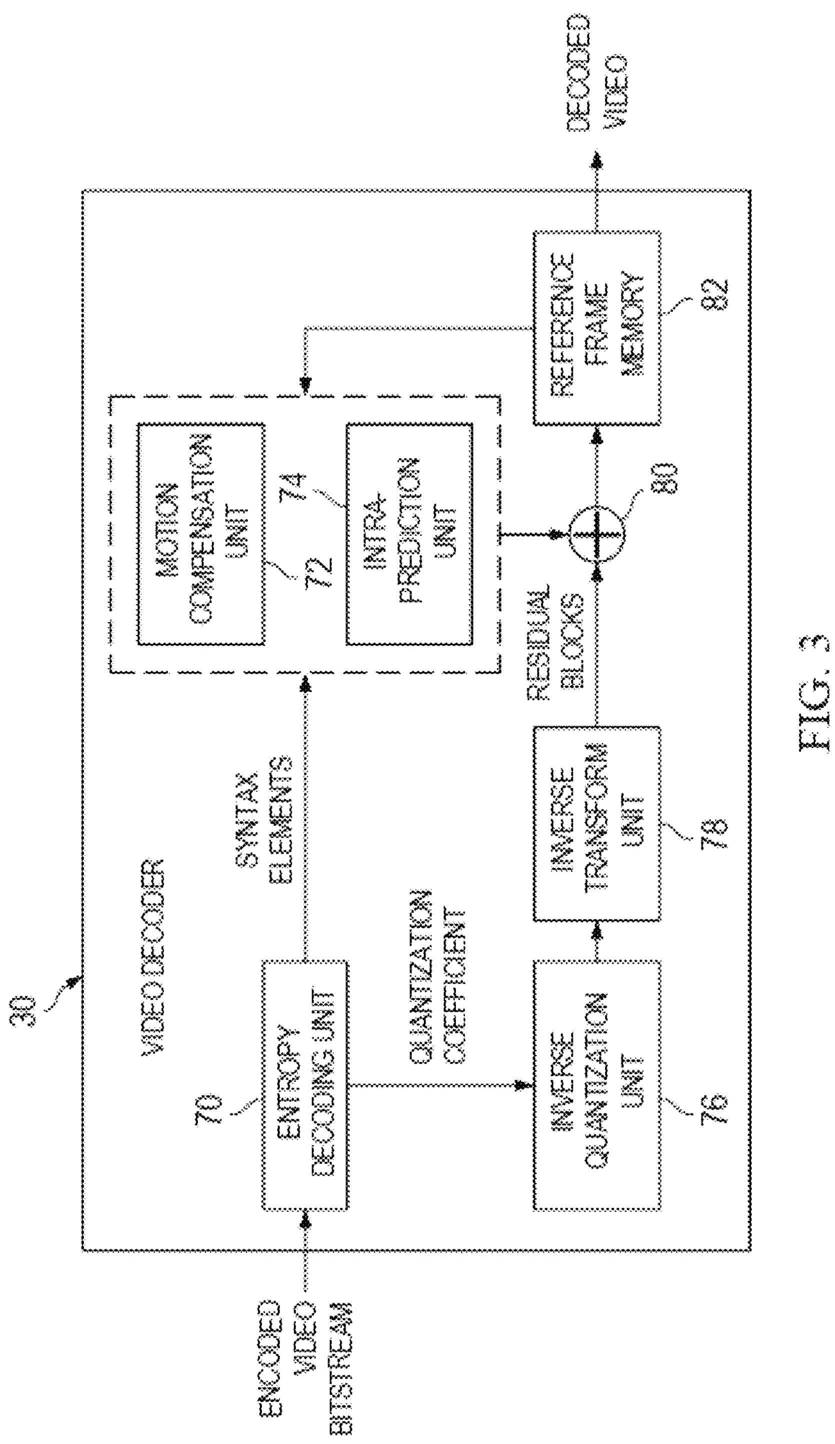
FIG. 3 is a block diagram illustrating an example of a video decoder that may implement embodiments of the disclosure.

FIG. 1B is an illustrative diagram of an example video coding system 40 including the video encoder 20 of FIG. 2 and/or the video decoder 30 of FIG. 3 according to an exemplary embodiment. The video coding system 40 can implement techniques of this present application. In the illustrated implementation, video coding system 40 may include imaging device(s) 41, video encoder 20, video decoder 30 (and/or a video coder implemented via logic circuitry 47 of processing unit(s) 46), an antenna 42, one or more processor(s) 43, one or more memories or memory store(s) 44, and/or a display device 45. As illustrated, imaging device(s) 41, antenna 42, processing unit(s) 46, logic circuitry 47, video encoder 20, video decoder 30, processor(s) 43, memory store(s) 44, and/or display device 45 may be capable of communicating with one another. As discussed, although FIG. 1B shows both the video encoder 20 and the video decoder 30, the video coding system 40 may include only the video encoder 20 or only the video decoder 30 in various examples.

As shown, in some examples, video coding system 40 may include the antenna 42. The antenna 42 may be configured to transmit or receive an encoded bitstream of video data, for example. Further, in some examples, video coding system 40 may include the display device 45.

The display device 45 may be configured to present video data. As shown, in some examples, the logic circuitry 47 may be implemented via the processing unit(s) 46. The processing unit(s) 46 may include application-specific integrated circuit (ASIC) logic, graphics processor(s), general purpose processor(s), or the like. Video coding system 40 also may include optional processor(s) 43, which may similarly include application-specific integrated circuit (ASIC) logic, graphics processor(s), general purpose processor(s), or the like. In some examples, the logic circuitry 47 may be implemented via hardware, video coding dedicated hardware, or the like, and the processor(s) 43 may be implemented by general purpose software, operating systems, or the like. In addition, the memory store(s) 44 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, the memory store(s) 44 may be implemented by cache memory. In some examples, the logic circuitry 47 may access memory store(s) 44 (for implementation of an image buffer for example). In other examples, the logic circuitry 47 and/or the processing unit(s) 46 may include memory stores (e.g., cache or the like) for the implementation of an image buffer or the like.

The graphics processing unit may include video encoder 20 as implemented via logic circuitry 47 to embody the various modules as discussed with respect to FIG. 2 and/or any other encoder system or subsystem described herein. The logic circuitry 47 may be configured to perform the various operations discussed herein. The video decoder 30 may be implemented in a similar manner as implemented via logic circuitry 47 to embody the various modules as discussed with respect to decoder 30 of FIG. 3 and/or any other decoder system or subsystem described herein. In some examples, the video encoder 20 and the video decoder 30 may be implemented via logic circuitry and may include an image buffer (e.g., via either processing unit(s) 46 or memory store(s) 44)) and a graphics processing unit (GPU) (e.g., via processing unit(s) 46). The graphics processing unit may be communicatively coupled to the image buffer. The graphics processing unit may include video decoder 30 as implemented via logic circuitry 47 to embody the various modules as discussed with respect to FIG. 3 and/or any other decoder system or subsystem described herein.

In some examples, antenna 42 of video coding system 40 may be configured to receive an encoded bitstream of video data. As discussed, the encoded bitstream may include data, indicators, index values, mode selection data, or the like associated with encoding a video frame as discussed herein, such as data associated with the coding partition (e.g., transform coefficients or quantized transform coefficients, optional indicators (as discussed), and/or data defining the coding partition). Video coding system 40 may also include video decoder 30 coupled to antenna 42 and configured to decode the encoded bitstream. The display device 45 configured to present video frames.

FIG. 2 is a block diagram illustrating an example of the video encoder 20 that may implement the techniques of the present application. The video encoder 20 may perform intra-coding and inter-coding of video blocks within video slices. Intra-coding relies on spatial prediction to reduce or remove spatial redundancy in a video within a given video frame or picture. Inter-coding relies on temporal prediction to reduce or remove temporal redundancy in video within adjacent frames or pictures of a video sequence. Intra-mode (I mode) may refer to any of several spatial-based coding modes. Inter-modes, such as uni-directional prediction (P mode) or bi-prediction (B mode), may refer to any of several temporal-based coding modes.

As shown in FIG. 2, the video encoder 20 receives a current video block within a video frame to be encoded. In the example of FIG. 2, the video encoder 20 includes a mode select unit 40, a reference frame memory 64, a summer 50, a transform processing unit 52, a quantization unit 54, and an entropy coding unit 56. The mode select unit 40 includes a motion compensation unit 44, a motion estimation unit 42, an intra-prediction unit 46, and a partition unit 48. For video block reconstruction, the video encoder 20 also includes an inverse quantization unit 58, an inverse transform unit 60, and a summer 62. A deblocking filter (not shown in FIG. 2) may also be included to filter block boundaries to remove blockiness artifacts from a reconstructed video. If desired (e.g. activated or implemented at all), the deblocking filter filters the output of the summer 62. Additional filters (in loop or post loop) may also be used in addition to the deblocking filter. Such filters are not shown for brevity, but if desired, may filter for example, the output of the summer 50 (as an in-loop filter).

During the encoding process, the video encoder 20 receives a video frame or slice to be coded. The frame or slice may be divided into multiple video blocks. The motion estimation unit 42 and the motion compensation unit 44 perform inter-predictive coding of the received video block relative to one or more blocks in one or more reference frames to provide temporal prediction. The intra-prediction unit 46 may alternatively perform intra-predictive coding of the received video block relative to one or more neighboring blocks in the same frame or slice as the block to be coded to provide spatial prediction. The video encoder 20 may perform multiple coding passes, e.g., to select an appropriate coding mode for each block of video data.

Moreover, the partition unit 48 may partition blocks of video data into sub-blocks or partitions based on an evaluation of previous partitioning schemes in previous coding passes or steps. For example, the partition unit 48 may initially partition a frame or slice into largest coding units (LCUs), and partition each of the LCUs into sub-coding units (sub-CUs) based on a rate-distortion analysis (e.g., rate-distortion optimization). The mode select unit 40 may further produce a quadtree data structure indicative of or indicating a partitioning of a LCU into sub-CUs. Leaf-node CUs of the quadtree may include one or more prediction units (PUs) and one or more transform units (TUs).

The present disclosure uses the term "block" to refer to any of a CU, PU, or TU, for example in the context of HEVC or VVC, or similar data structures in the context of other standards (e.g., macroblocks and sub-blocks thereof in H.264/AVC). A CU includes, for example, a coding node, PUs, and TUs associated with the coding node. A size of the CU corresponds to a size of the coding node and is, for example, square in shape. The size of the CU may range from 8×8 pixels up to the size of the treeblock with a maximum of 64×64 pixels or greater, e.g. 128×128 pixels. Each CU may contain one or more PUs and one or more TUs. Syntax data associated with a CU may describe, for example partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example partitioning of the CU into one or more TUs according to a quadtree. In an embodiment, a CU, PU, or TU can be square or non-square (e.g., rectangular) in shape.

The mode select unit 40 may select one of the coding modes, intra or inter, e.g., based on error results and provide the resulting intra-coded or inter-coded block to the summer 50 to generate residual block data and to the summer 62 to reconstruct the encoded block for use as a reference frame. The mode select unit 40 also provides syntax elements, such as motion vectors, intra-mode indicators, partition information, and/or other such syntax information, to the entropy coding unit 56.

The motion estimation unit 42 and the motion compensation unit 44 may be highly integrated, but are illustrated separately for conceptual purposes. Motion estimation, performed by the motion estimation unit 42, is the process of generating motion vectors, which estimate motion for video blocks. A motion vector, for example may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded in terms of pixel difference, which may be determined by a sum of absolute difference (SAD), a sum of square difference (SSD), or other difference metrics. In some examples the video encoder 20 may calculate values for sub-integer pixel positions of reference pictures stored in the reference frame memory 64. For example, the video encoder 20 may interpolate values of one-quarter pixel positions, one-eighth pixel positions, or other fractional pixel positions of the reference picture. Therefore, the motion estimation unit 42 may perform a motion search relative to the full pixel positions and fractional pixel positions and output a motion vector with fractional pixel precision.

The motion estimation unit 42 calculates a motion vector for a PU of a video block in an inter-coded slice by comparing the position of the PU to the position of a predictive block of a reference picture. The reference picture may be selected from a first reference picture list (List 0), or a second reference picture list (List 1), each of which identify one or more reference pictures stored in the reference frame memory 64. The motion estimation unit 42 sends the calculated motion vector to the entropy encoding unit 56 and the motion compensation unit 44.

Motion compensation, performed by the motion compensation unit 44, may involve fetching or generating the predictive block based on the motion vector determined by the motion estimation unit 42. Again, motion estimation unit 42 and motion compensation unit 44 may be functionally integrated, in some examples. Upon receiving the motion vector for the PU of the current video block, the motion compensation unit 44 may locate the predictive block to which the motion vector points in one of the reference picture lists. The summer 50 forms a residual video block by subtracting pixel values of the predictive block from the pixel values of the current video block being coded, forming pixel difference values as discussed below. In general, the motion estimation unit 42 performs motion estimation relative to luma components, and the motion compensation unit 44 uses motion vectors calculated based on the luma components for both chroma components and luma components. The mode select unit 40 may also generate syntax elements associated with the video blocks and the video slice for use by the video decoder 30 in decoding the video blocks of the video slice.

The intra-prediction unit 46 may intra-predict a current block as an alternative to the inter-prediction performed by the motion estimation unit 42 and the motion compensation unit 44, as described above. In particular, the intra-prediction unit 46 may determine an intra-prediction mode to use to encode a current block. In some examples, the intra-prediction unit 46 may encode a current block using various intra-prediction modes, e.g., during separate encoding passes or steps, and the intra-prediction unit 46 (or the mode select unit 40, in some examples) may select an appropriate intra-prediction mode to use from the tested modes.

For example, the intra-prediction unit 46 may calculate rate-distortion values using a rate-distortion analysis for the various tested intra-prediction modes and select the intra-prediction mode having the best rate-distortion characteristics among the tested modes. The rate-distortion analysis generally determines an amount of distortion (or error) between an encoded block and an original, un-encoded block that was encoded to produce the encoded block, as well as a bitrate (that is, a number of bits) used to produce the encoded block. The intra-prediction unit 46 may calculate ratios from the distortions and rates for the various encoded blocks to determine which intra-prediction mode exhibits the best rate-distortion value for the block.

In addition, the intra-prediction unit 46 may be configured to code depth blocks of a depth map using a depth modeling mode (DMM). The mode select unit 40 may determine whether an available DMM mode produces better coding results than an intra-prediction mode and the other DMM modes, e.g., using rate-distortion optimization (RDO). Data for a texture image corresponding to a depth map may be stored in reference frame memory 64. The motion estimation unit 42 and the motion compensation unit 44 may also be configured to inter-predict depth blocks of a depth map.

After selecting an intra-prediction mode for a block (e.g., a conventional intra-prediction mode or one of the DMM modes), the intra-prediction unit 46 may provide information indicative of the selected intra-prediction mode for the block to the entropy coding unit 56. The entropy coding unit 56 may encode the information indicating the selected intra-prediction mode. The video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

The video encoder 20 forms a residual video block by subtracting the prediction data from the mode select unit 40 from the original video block being coded. The summer 50 represents the component or components that perform this subtraction operation.

The transform processing unit 52 applies a transform, such as a discrete cosine transform (DCT) or a conceptually similar transform, to the residual block, producing a video block comprising residual transform coefficient values. The transform processing unit 52 may perform other transforms which are conceptually similar to the DCT. Wavelet transforms, integer transforms, sub-band transforms, or other types of transforms could also be used.

The transform processing unit 52 applies the transform to the residual block, producing a block of residual transform coefficients. The transform may convert the residual information from a pixel value domain to a transform domain such as a frequency domain. The transform processing unit 52 may send the resulting transform coefficients to the quantization unit 54. The quantization unit 54 quantizes the transform coefficients to further reduce bit rate. The quantization process may reduce the bit depth associated with some or all of the coefficients. The degree of quantization may be modified by adjusting a quantization parameter. In some examples, the quantization unit 54 may then perform a scan of the matrix including the quantized transform coefficients. Alternatively, the entropy encoding unit 56 may perform the scan.

Following quantization, the entropy coding unit 56 entropy codes the quantized transform coefficients. For example, the entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding, or another entropy coding technique. In the case of context-based entropy coding, the context may be based on neighboring blocks. Following the entropy coding by the entropy coding unit 56, the encoded bitstream may be transmitted to another device (e.g., video decoder 30) or archived for later transmission or retrieval.

The inverse quantization unit 58 and the inverse transform unit 60 apply inverse quantization and inverse transformation, respectively, to reconstruct the residual block in the pixel domain, e.g., for later use as a reference block. The motion compensation unit 44 may determine a prediction block (also referred to as predictive block), e.g. a motion compensated prediction block based on a motion vector and a corresponding reference block, e.g., derived from a reference frame of one of the frames of the reference frame memory 64. The motion compensation unit 44 may also apply one or more interpolation filters to calculate sub-integer pixel values of a reference block for use in motion estimation or compensation. The summer 62 adds the reconstructed residual block to the (motion compensated) prediction block produced by the motion compensation unit 44 to produce a reconstructed video block for storage in the reference frame memory 64. The reconstructed video block may be used by the motion estimation unit 42 and the motion compensation unit 44 as a reference block to inter-code a block in a subsequent video frame.

Other structural variations of the video encoder 20 can be used to encode the video stream. For example, a non-transform-based video encoder 20 can quantize the residual signal directly without the transform processing unit 52 for certain blocks or frames. In another implementation, an encoder 20 can have the quantization unit 54 and the inverse quantization unit 58 combined into a single unit.

FIG. 3 is a block diagram illustrating an example of the video decoder 30 that may implement the techniques of this present application. In the example of FIG. 3, the video decoder 30 includes an entropy decoding unit 70, a motion compensation unit 72, an intra-prediction unit 74, an inverse quantization unit 76, an inverse transform unit 78, a reference frame memory 82, and a summer 80. The video decoder 30 may, in some examples, perform a decoding pass or path generally reciprocal to the encoding pass or path described with respect to the video encoder 20 in FIG. 2. The motion compensation unit 72 may generate prediction data based on motion vectors received from the entropy decoding unit 70, while the intra-prediction unit 74 may generate prediction data based on intra-prediction mode indicators received from the entropy decoding unit 70.

During the decoding process, the video decoder 30 receives an encoded video bitstream that represents video blocks of an encoded video slice and associated syntax elements generated from the video encoder 20. The entropy decoding unit 70 of video decoder 30 entropy decodes the bitstream to generate quantized coefficients, motion vectors or intra-prediction mode indicators, and other syntax elements. The entropy decoding unit 70 forwards the motion vectors and other syntax elements to the motion compensation unit 72. The video decoder 30 may receive the syntax elements at the video slice level and/or the video block level.

When the video slice is coded as an intra-coded (I) slice, the intra-prediction unit 74 may generate prediction data for a video block of the current video slice based on a signaled intra-prediction mode and data from previously decoded blocks of the current frame or picture. When the video frame is coded as an inter-coded (i.e., B, P, or GPB) slice, the motion compensation unit 72 produces predictive blocks for a video block of the current video slice based on the motion vectors and other syntax elements received from the entropy decoding unit 70. The predictive blocks may be produced from one of the reference pictures within one of the reference picture lists. The video decoder 30 may construct the reference frame lists, List 0 and List 1, using default construction techniques based on reference pictures stored in the reference frame memory 82.

The motion compensation unit 72 determines prediction information for a video block of the current video slice by parsing the motion vectors and other syntax elements and uses the prediction information to produce the predictive blocks for the current video block being decoded. For example, the motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

The motion compensation unit 72 may also perform interpolation based on interpolation filters. The motion compensation unit 72 may use interpolation filters as used by the video encoder 20 during encoding of the video blocks to calculate interpolated values for sub-integer pixels of reference blocks. In this case, the motion compensation unit 72 may determine the interpolation filters used by the video encoder 20 from the received syntax elements and use the interpolation filters to produce predictive blocks.

Data for a texture image corresponding to a depth map may be stored in the reference frame memory 82. The motion compensation unit 72 may also be configured to inter-predict depth blocks of a depth map.

Returning to FIG. 1A, the video coding system 10 is suitable for implementing various video coding or compression techniques. Some video compression techniques, such as inter-prediction, intra-prediction, and loop filters, have demonstrated to be effective. Therefore, the video compression techniques have been adopted into various video coding standards such as H.264/AVC and H.265/HEVC.

Various coding tools such as adaptive motion vector prediction (AMVP) and merge mode (MERGE) may be used to predict motion vectors (MVs) and enhance inter prediction efficiency and, therefore, the overall video compression efficiency.

The MVs noted above may be utilized in bi-prediction. In a bi-prediction operation, two prediction blocks are formed. One prediction block is formed using an MV of list0 (referred to herein as MV0). Another prediction block is formed using an MV of list 1 (referred to herein as MV1). The two prediction blocks are then combined (e.g., averaged) in order to form a single prediction signal (e.g., a prediction block or a predictor block).

Other variations of the video decoder 30 can be used to decode the compressed bitstream. For example, the decoder 30 can produce the output video stream without the loop filtering unit. For example, a non-transform-based decoder 30 can inverse-quantize the residual signal directly without the inverse transform processing unit 78 for certain blocks or frames. In another implementation, the video decoder 30 can have the inverse-quantization unit 76 and the inverse transform processing unit 78 combined into a single unit.

Figure 4:
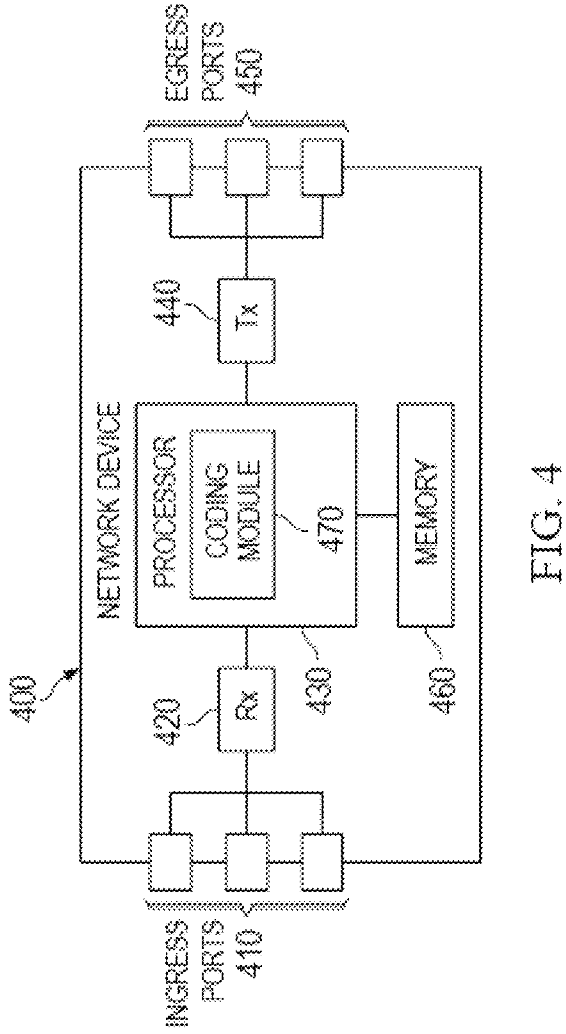
FIG. 4 is a schematic diagram of a network device according to an embodiment of the disclosure.

FIG. 4 is a schematic diagram of a network device 400 (e.g., a coding device) according to an embodiment of the disclosure. The network device 400 is suitable for implementing the disclosed embodiments as described herein. In an embodiment, the network device 400 may be a decoder such as the video decoder 30 of FIGS. 1A and 3 or an encoder such as the video encoder 20 of FIGS. 1A and 2. In an embodiment, the network device 400 may be one or more components of the video decoder 30 of FIGS. 1A and 3 or the video encoder 20 of FIGS. 1A and 2 as described above.

The network device 400 comprises ingress ports 410 and receiver units (Rx) 420 for receiving data; a processor, logic unit, or central processing unit (CPU) 430 to process the data; transmitter units (Tx) 440 and egress ports 450 for transmitting the data; and a memory 460 for storing the data. The network device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 may be implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the network device 400 and effects a transformation of the network device 400 to a different state. Alternatively, the coding module 470 is implemented as instructions stored in the memory 460 and executed by the processor 430.

The memory 460 comprises one or more disks, tape drives, and solid-state drives and may be used as an overflow data storage device, to store programs when such programs are selected for execution, and to store instructions and data that are read during program execution. The memory 460 may be volatile and/or non-volatile and may be read-only memory (ROM), random access memory (RAM), ternary content-addressable memory (TCAM), and/or static random-access memory (SRAM).

Figure 5:
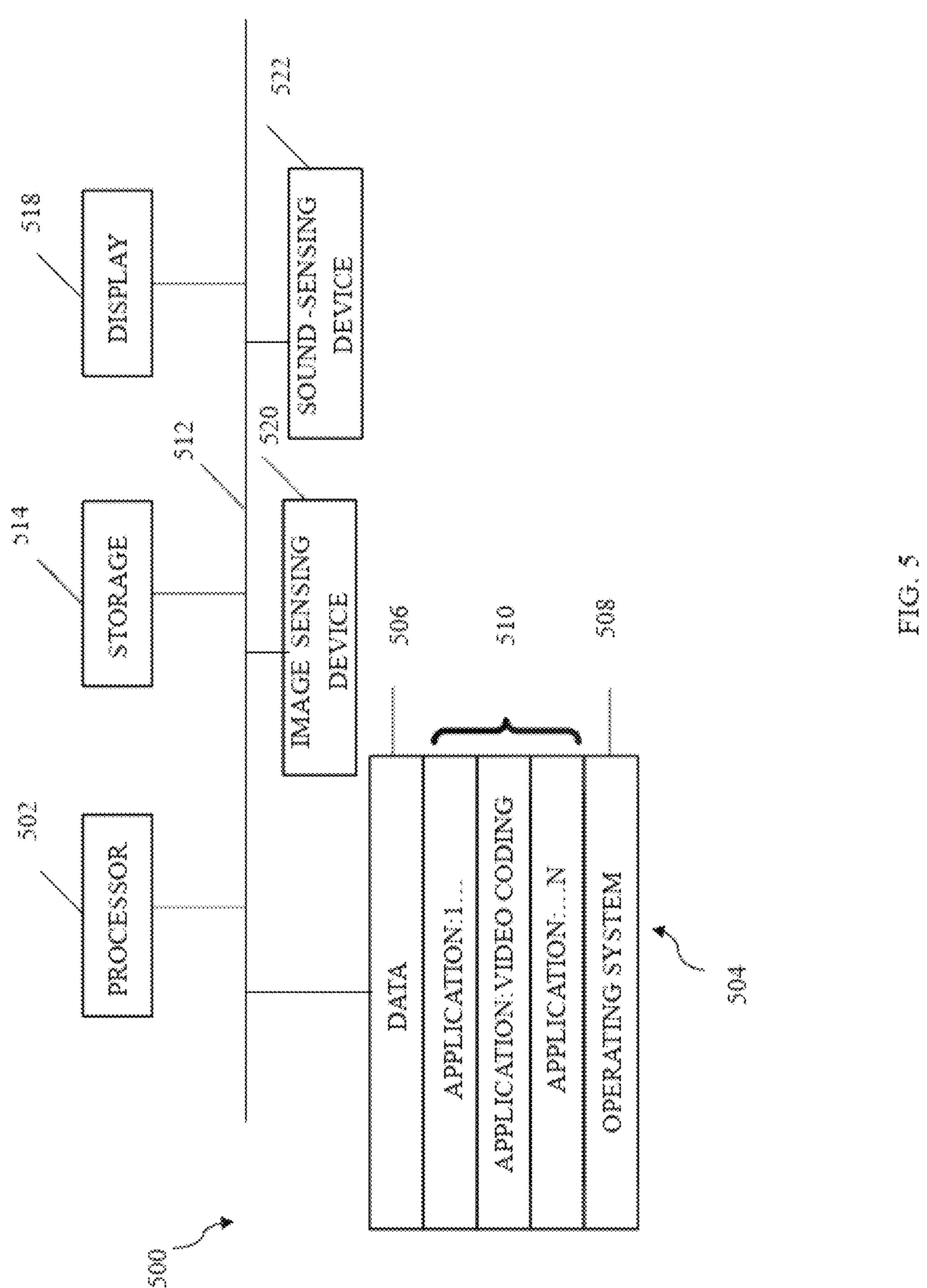
FIG. 5 is a simplified block diagram of an apparatus that may be used as either or both of the source device 12 and the destination device 14 from FIG. 1A according to an exemplary embodiment.

FIG. 5 is a simplified block diagram of an apparatus 500 that may be used as either or both of the source device 12 and the destination device 14 in FIG. 1A according to an exemplary embodiment. The apparatus 500 can implement techniques of this present application. The apparatus 500 can be in the form of a computing system including multiple computing devices or in the form of a single computing device, for example, a mobile phone, a tablet computer, a laptop computer, a notebook computer, a desktop computer, and the like.

A processor 502 in the apparatus 500 can be a central processing unit. Alternatively, the processor 502 can be any other type of device or multiple devices capable of manipulating or processing information now existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that are accessed by the processor 502 using a bus 512. The memory 504 can further include an operating system 508 and application programs 510, and the application programs 510 include at least one program that permits the processor 502 to perform the methods described herein. For example, the application programs 510 can include applications 1 through N, which further include a video coding application that performs the methods described herein. The apparatus 500 can also include additional memory in the form of a secondary storage 514, which can, for example, be a memory card used with a mobile computing device. Because the video communication sessions may contain a significant amount of information, they can be stored in whole or in part in the secondary storage 514 and loaded into the memory 504 as needed for processing.

The apparatus 500 can also include one or more output devices, such as a display 518. The display 518 may be, in one example, a touch-sensitive display that combines a display with a touch-sensitive element that is operable to sense touch inputs. The display 518 can be coupled to the processor 502 via the bus 512. Other output devices that permit a user to program or otherwise use the apparatus 500 can be provided in addition to or as an alternative to the display 518. When the output device is or includes a display, the display can be implemented in various ways, including by a liquid crystal display (LCD), a cathode-ray tube (CRT) display, a plasma display or light emitting diode (LED) display, such as an organic LED (OLED) display.

The apparatus 500 can also include or be in communication with an image-sensing device 520, for example, a camera or any other image-sensing device 520 now existing or hereafter developed that can sense an image such as the image of a user operating the apparatus 500. The image-sensing device 520 can be positioned such that it is directed toward the user operating the apparatus 500. In an example, the position and optical axis of the image-sensing device 520 can be configured such that the field of vision includes an area that is directly adjacent to the display 518 and from which the display 518 is visible.

The apparatus 500 can also include or be in communication with a sound-sensing device 522, for example, a microphone or any other sound-sensing device now existing or hereafter developed that can sense sounds near the apparatus 500. The sound-sensing device 522 can be positioned such that it is directed toward the user operating the apparatus 500 and can be configured to receive sounds, for example, speech or other utterances made by the user while the user operates the apparatus 500.

Although FIG. 5 depicts the processor 502 and the memory 504 of the apparatus 500 as being integrated into a single unit, other configurations can be utilized. The operations of the processor 502 can be distributed across multiple machines (each machine having one or more of processors) that can be coupled directly or across a local area or other network. The memory 504 can be distributed across multiple machines such as a network-based memory or memory in multiple machines performing the operations of the apparatus 500. Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

The Versatile Video Coding (VVC) next generation standard is the most recent joint video project of the International Telecommunications Union Telecommunication Standardization Sector (ITU-T) Video Coding Experts Group (VCEG) and the International Organization for Standardization/International Electrotechnical Commission (ISO/IEC) Moving Picture Experts Group (MPEG) standardization organizations, working together in a partnership known as the Joint Video Exploration Team (JVET). In VVC, a multi-type (binary/ternary/quaternary) tree (BT/TT/QT or binary tree/ternary tree/quarternary tree) segmentation structure shall replace, or may replace, the concept of multiple partition unit types, i.e. it removes the separation of the CU, PU, and TU concepts except as needed for CUs that have a size too large for the maximum transform length and supports more flexibility for CU partition shapes. [JVET-J1002].

Figure 6:
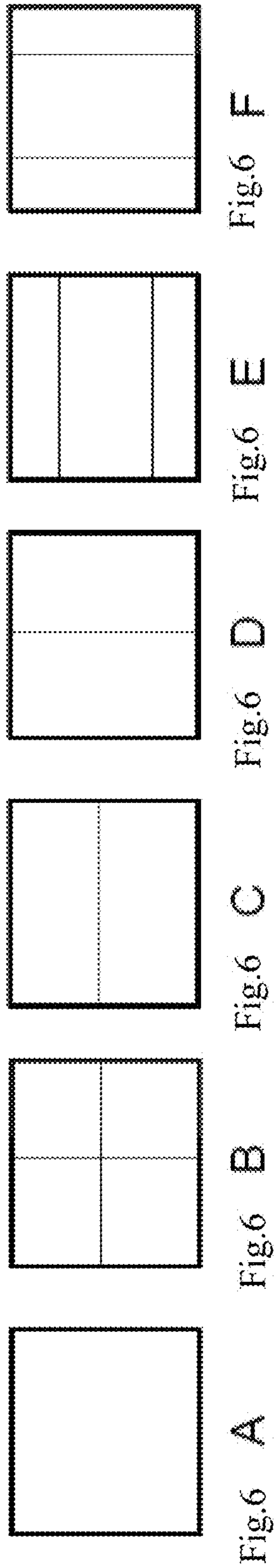
FIGS. 6A-F show different CU splitting modes in VVC.

FIGS. 6A-F illustrate, as an example, the partition modes currently used in VTM. FIG. 6A shows an unsplit block (no split), FIG. 6Bb shows quaternary or quadtree (QT) partitioning, FIG. 6C shows a horizontal binary or binary tree (BT) partitioning, FIG. 6D shows a vertical binary or binary tree (BT) partitioning, FIG. 6E shows a horizontal ternary or ternary tree (TT) partitioning, and FIG. 6F shows a vertical ternary or ternary tree (TT) partitioning of a block such as a CU or CTU. Embodiments may be configured to implement the partition modes as shown in FIGS. 6A to 6F.

In embodiments the following parameters may be defined and specified by sequence parameter set (SPS) syntax elements for the BT/TT/QT coding tree scheme:

- CTU size: the root node size of a quaternary tree
- MinQTSize: the minimum allowed quaternary tree leaf node size
- MaxBTTSize: the maximum allowed binary and ternary tree root node size
- MaxBTTDepth: the maximum allowed binary and ternary tree depth, and
- MinBTTSize: the minimum allowed binary and ternary tree leaf node size In other embodiments the minimum allowed quaternary tree leaf node size MinQTSize parameter might also be comprised in other headers or sets, for example, the slice header (SH) or picture parameter set (PPS).

In the HEVC standard, the coding tree units (CTU) or coding units (CU), which are located on the slice/picture boundaries, will be forced split using quadtree (QT) until the right-bottom sample of the leaf node is located within the slice/picture boundary. The forced QT partition or partitioning does not need to be signaled in the bitstream because both encoder and decoder, e.g. both video encoder 20 and video decoder 30, know when to apply forced QT. The purpose of forced partition is to make the boundary CTU/CU possible by the video encoder 20/video decoder 30.

International patent publication number WO 2016/090568 discloses a QTBT (quadtree plus binary tree) structure, and also in VTM 1.0, the boundary CTU/CU forced partitioning process is inherited from HEVC. That means the CTU/CU located on the frame boundary is forced partitioned by a quadtree (QT) structure without considering rate-distortion (RD) optimization until the whole current CU lies inside the picture boundary. These forced partitions are not signaled in the bitstream.

Figure 7A:
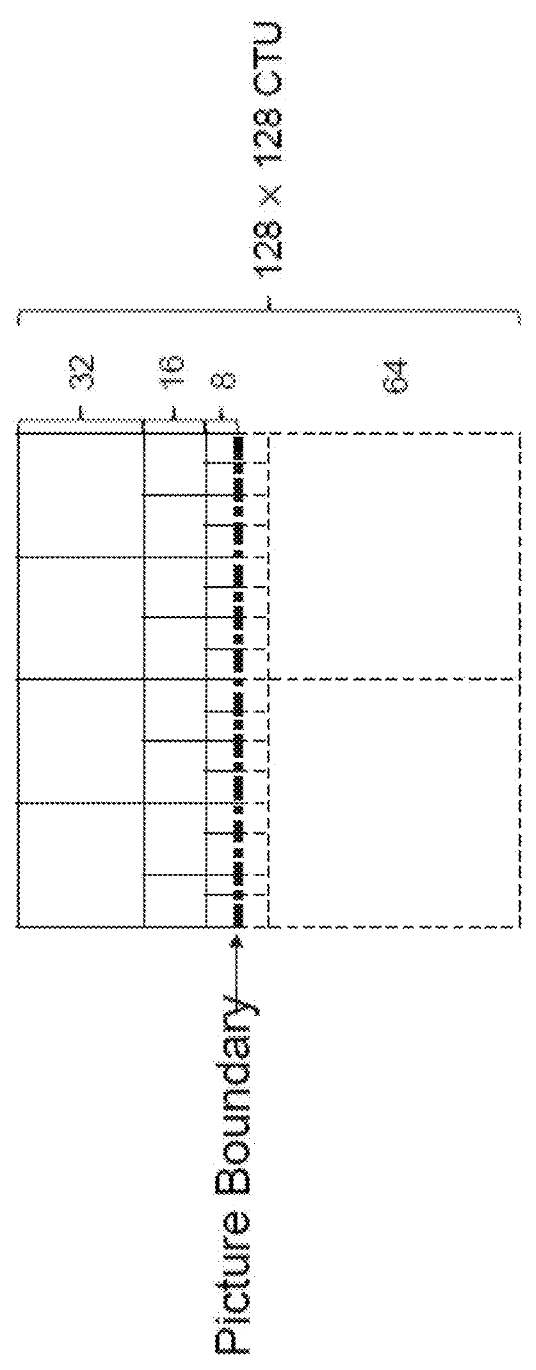
FIG. 7A shows an HD (1920×1080) bottom boundary CTU (128×128) forced QT partition.

FIG. 7A shows a forced partition example for a high definition (HD) (1920×1080 pixels) bottom boundary CTU (128×128) partitioned by forced QT. In FIG. 7, the HD picture has or is 1920×1080 pixels, and the CTU has or is 128×128 pixels.

Figure 8:
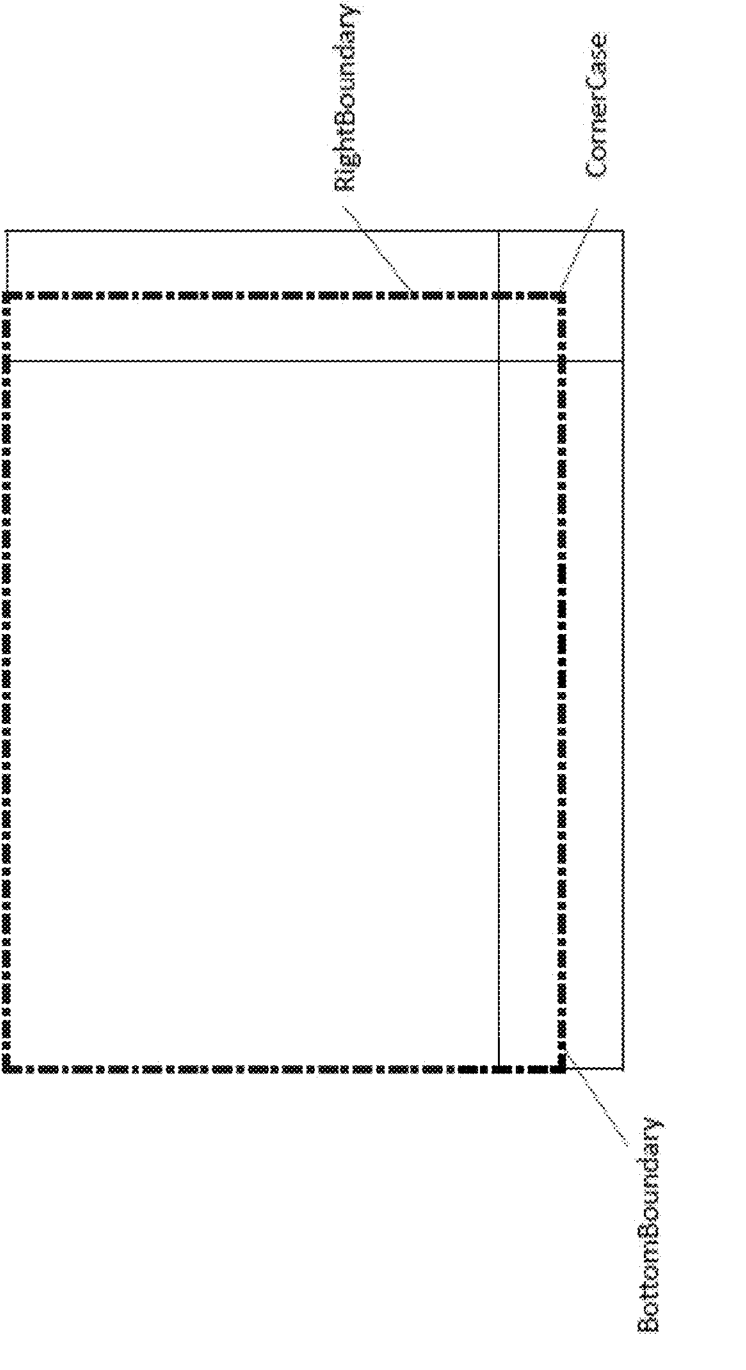
FIG. 8 shows an example boundary definition.

In SubCE2 (picture boundary handling) of CE1 (partitioning) at the San Diego meeting (04.2018) [JVET-J1021, 15 tests were proposed for picture boundary handling using BT, TT, or ABT (Asymmetric BT). In JVET-K0280 and JVET-K0376 for instance, the boundary is defined as shown in FIG. 8. FIG. 8 shows the borders of a picture by dot-hashed lines and areas of boundary cases in straight lines, namely a bottom boundary case, a corner boundary case and a right boundary case. A bottom boundary can be partitioned by horizontal forced BT or forced QT, a right boundary can be partitioned by vertical forced BT or forced QT, and a corner case can only be split by forced QT, wherein the decision whether to use any of the forced BT or forced QT partitioning is based on a rate distortion optimization criterion and is signaled in the bitstream. Forced partitioning means the block must be partitioned, e.g. forced partitioning is applied to boundary blocks which may not be coded using "no-split" as shown in FIG. 6A.

If the forced QT split is used in a forced boundary partitioning, the partitioning constraint of MinQTSize is ignored. For example, in FIG. 9A, if the MinQTSize is signaled as 32 in the SPS, to match the boundary with a forced QT method, a QT split down to a block size 8×8 would be necessary, which ignores the constraint of MinQTSize being 32.

According to embodiments of the disclosure, if the forced QT is used for picture boundary partitioning, the forced QT split obeys, e.g. does not ignore, a splitting constraint as signaled, for example, in an SPS. If further forced splitting is necessary, only forced BT is used, which may in combination also be referred to as forced QTBT. In embodiments of the disclosure, e.g. the partition constraint MinQTSize is considered for the forced QT partitioning at picture boundaries and no additional signaling for the forced BT partitioning is required. Embodiments also allow harmonizing the partitioning for normal (non-boundary) blocks and boundary blocks. E.g. in conventional solutions two "MinQTSize" parameters are required, one for normal block partitioning and another one for boundary block partitioning. Embodiments only require one common "MinQTSize" parameter for both, normal block and boundary block partitioning, which may be flexibly set between encoder and decoder, e.g. by signaling one "MinQTSize" parameter. Furthermore, embodiments require less partitions than, e.g., forced QT.

Solutions for Bottom Boundary Case and Right Boundary Case

In the bottom and right boundary case, if the block size is larger than MinQTSize, then the partition mode for picture boundary partitioning can be selected between forced BT partitioning and forced QT partitioning, e.g. based on RDO. Otherwise (i.e. if the block size is equal or smaller than the MinQTSize), only forced BT partitioning is used for picture boundary partitioning, more specifically, horizontal forced BT is used for a bottom boundary respectively for a boundary block located on the bottom boundary of a picture, and vertical forced BT is used for a right boundary respectively a for boundary block located on the right boundary of a picture.

The forced BT partitioning may comprise recursively partitioning the current block by a horizontal forced boundary partitioning until a sub-partition of the current block is located at the bottom boundary of the picture and recursively partitioning the sub-partition by a vertical forced boundary partitioning until a leaf node is entirely located at the right boundary of the picture. Alternatively, the forced BT partitioning may comprise recursively partitioning the current block by a vertical forced boundary partitioning until a sub-partition of the current block is located at the bottom boundary and recursively partitioning the sub-partition by a horizontal forced boundary partitioning until a leaf node is entirely located at the right boundary. MinQTSize may be applied also for controlling partitioning of a non-boundary block.

For instance, in the case shown in FIG. 7A, if the MinQTSize is, or is limited as, 32 while the size of a rectangular (non-square) block of height or width of 8 samples is needed to match the picture boundary, forced BT partitioning will be used for partitioning the 32×32 boundary located block. The BT partitions may be further partitioned using forced BT partitioning of the same type, e.g. in case forced vertical BT partitioning has been applied only further forced vertical BT partitioning is applied, and in case forced horizontal BT partitioning has been applied only further forced horizontal BT partitioning is applied. The forced BT portioning is continued until the leaf node is entirely within the picture.

Figure 7B:
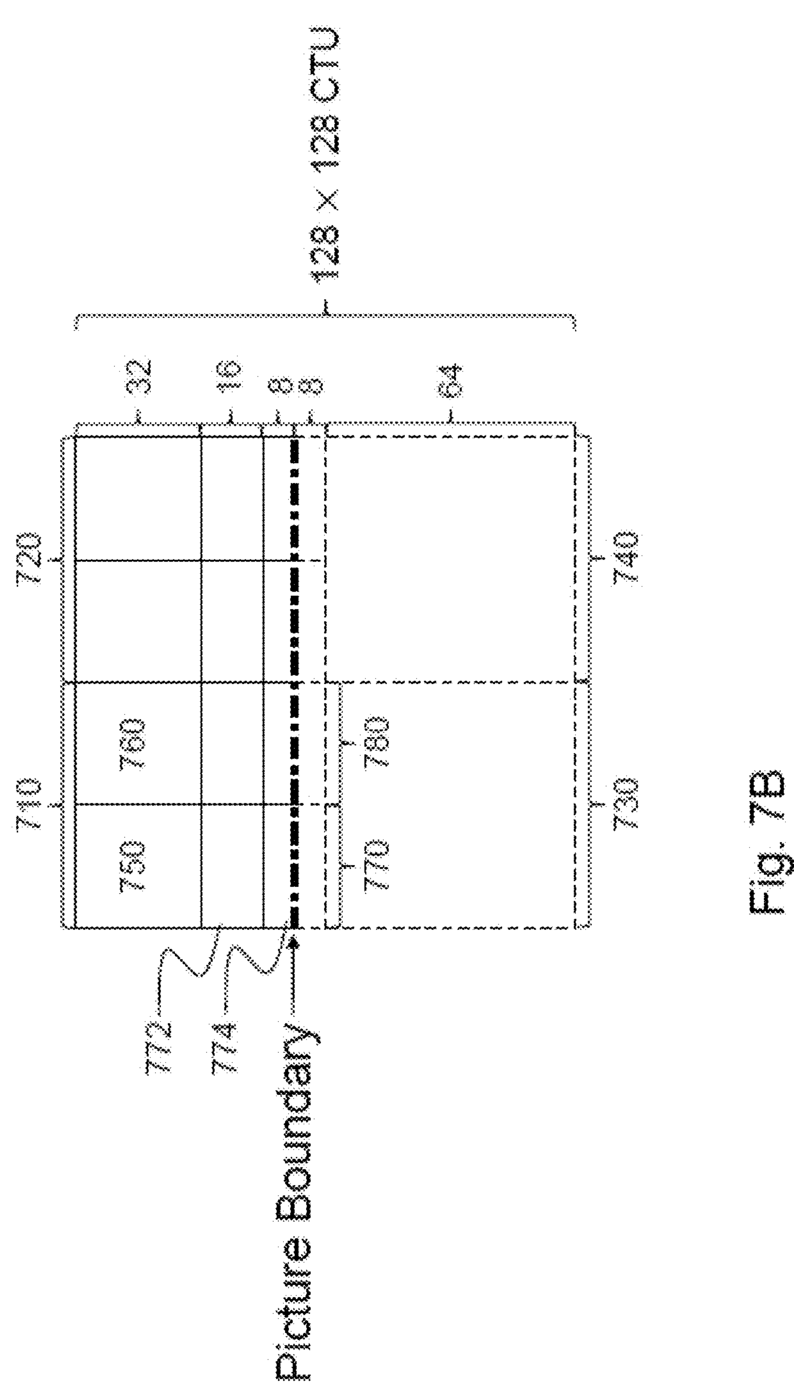
FIG. 7B shows an HD (1920×1080) bottom boundary CTU (128×128) forced BT partition according to an embodiment of the disclosure.

FIG. 7B shows an exemplary partitioning of a bottom boundary CTU with a size of 128×128 samples according to an embodiment of the disclosure. The bottom boundary CTU, which forms a root block or root node of a partitioning tree, is partitioned into smaller partitions, e.g. smaller blocks of square or rectangular size. These smaller partitions or blocks may be further partitioned into even smaller partitions or blocks. In FIG. 7B, the CTU is first quad-tree partitioned into four square blocks 710, 720, 730 and 740, each having a size of 64×64 samples. Of these blocks, blocks 710 and 720 are again bottom boundary blocks, whereas blocks 730 and 740 are outside of the picture (respectively are located outside of the picture) and are not processed.

Block 710 is further partitioned using quad-tree partitioning into four square blocks 750, 760, 770, and 780, each having a size of 32×32 samples. Blocks 750 and 760 are located inside of the picture, whereas blocks 770 and 780 again form bottom boundary blocks. As the size of block 770 is not larger than MinQTSize, which is for example 32, recursive horizontal forced binary partitioning is applied to block 770 until a leaf node is entirely within or located entirely inside the picture, e.g. until a leaf node block 772, a rectangular non-square block having 32×16 samples is within the picture (after one horizontal binary partitioning), or leaf node block 774, a rectangular non-square block located at the bottom boundary of the picture and having 32×8 samples is within the picture (after two horizontal binary partitionings). The same applies for block 780.

Embodiments of the disclosure allow harmonizing the partitioning for normal blocks located completely inside the picture and partitioning of boundary blocks. Boundary blocks are blocks which are not completely inside the picture and not completely outside of the picture. Put differently, boundary blocks are blocks that comprise a part that is located within the picture and a part that is located outside the picture. Furthermore, embodiments of the disclosure allow reducing the signaling as the forced BT partitioning at or below MinQTSize does not need to be signaled.

Solutions for Corner Case

In the corner case, some approaches allow only a forced QT split, which also ignores the constraint of MinQTSize. Embodiments of the disclosure provide two solutions for the corner case.

Figure 10:
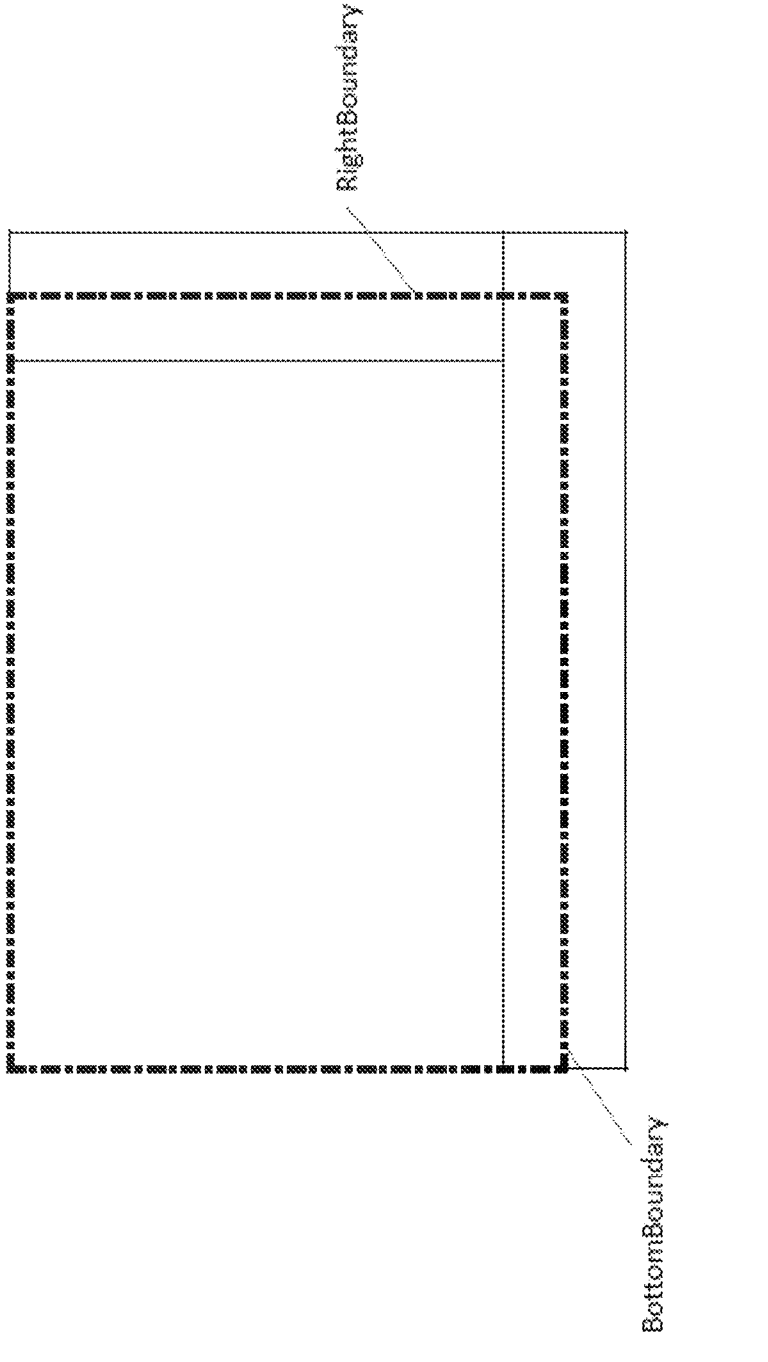
FIG. 10 shows an embodiment of a boundary definition.

Solution 1:

The corner case is considered as a bottom boundary case or a right boundary case. FIG. 10 shows an embodiment of a boundary definition. FIG. 10 shows the borders of a picture by dot-hashed lines and areas of boundary cases in straight lines. As shown, the corner case is defined as a bottom boundary case. Thus, the solution is the same as described for the bottom boundary case and right boundary case above. In other words, first a horizontal partitioning is applied (as described for the bottom boundary case) until the blocks or partitions are entirely within the picture (in vertical direction), and then a vertical partitioning is applied (as described for the right boundary case) until the leaf nodes are entirely within the picture (in horizontal direction).

Solution 2:

The definition of the boundary cases is still kept as is. If forced QT is constrained by MinQTSize (current block size equal or smaller then MinQTSize), use horizontal forced BT to match the bottom boundary, when the bottom boundary matches, use vertical forced BT to match the right boundary.

Figure 9A:
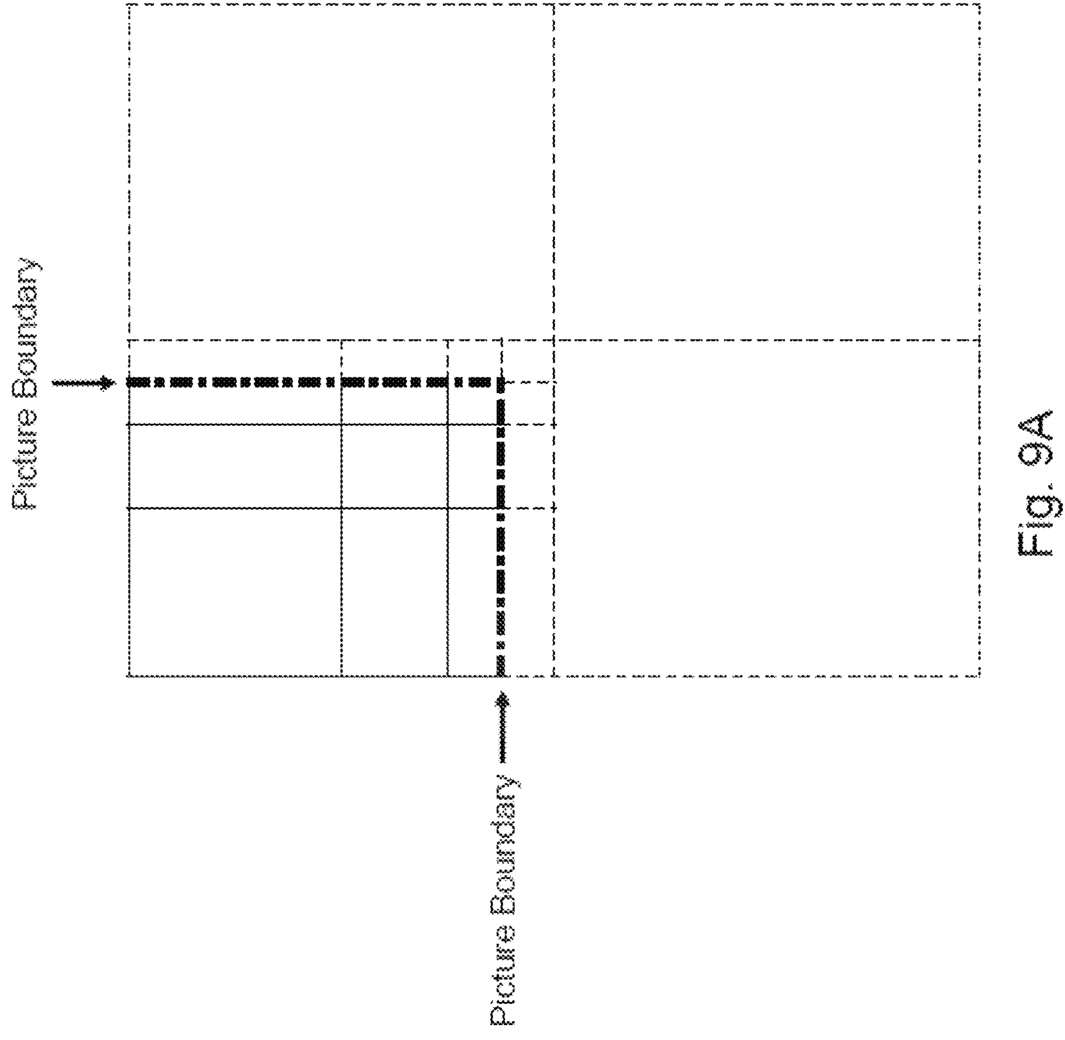
FIG. 9A shows an example of a corner case forced QTBT partition according to an embodiment of the disclosure.

For example, in FIG. 9A, which shows an embodiment of a forced QTBT for a block located at a corner of a picture, if MinQTSize is, or is limited as, 32 for the corner case forced QT partition, further BT partition will be used after the partition of the 32×32 block until the forced partition is terminated.

Figure 9B:
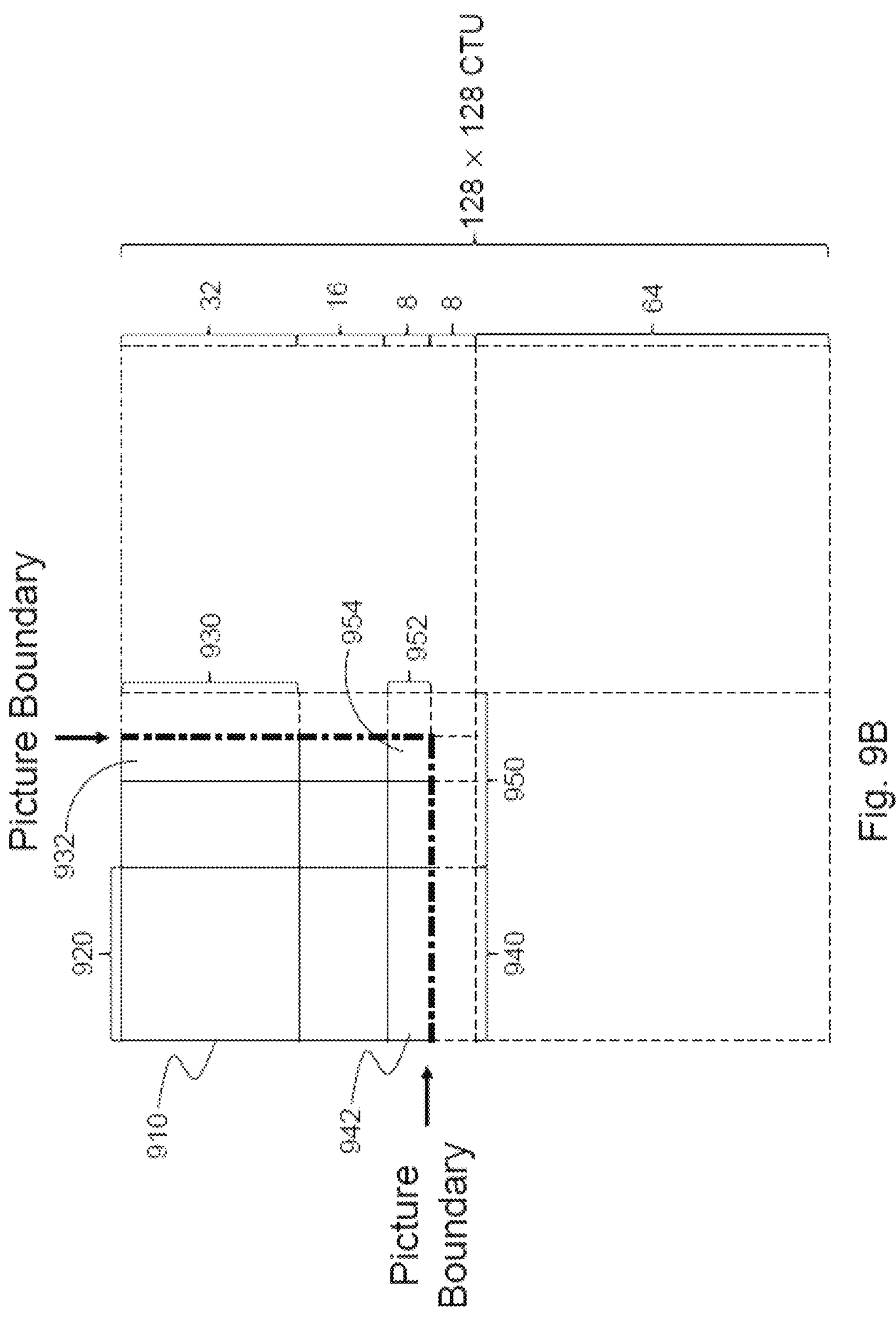
FIG. 9B shows an example of a forced QTBT partition for a block located at a corner according to an embodiment of the disclosure.

FIG. 9B shows further details of an exemplary partitioning of a boundary CTU at or in a corner of a picture according to an embodiment of the disclosure, wherein the CTU has a size of 128×128 samples. The CTU is first quad-tree partitioned into four square blocks, each having a size of 64×64 samples. Of these blocks, only the top-left block 910 is a boundary block, whereas the other three are located outside (entirely outside) of the picture and are not further processed. Block 910 is further partitioned using quad-tree partitioning into four square blocks 920, 930, 940 and 950, each having a size of 32×32 samples. Block 920 is located inside of the picture, whereas blocks 930, 940 and 950 again form boundary blocks. As the size of these blocks 930, 940 and 950 is not larger than MinQTSize, which is 32, forced binary partitioning is applied to blocks 930, 940 and 950.

Block 930 is located on a right boundary and partitioned using recursive vertical forced binary partitioning until a leaf node is within the picture, e.g. block 932 located at the right boundary of the picture (here after two vertical binary partitionings).

Block 940 is located on a bottom boundary and partitioned using recursive horizontal forced binary partitioning until a leaf node is within the picture, e.g. block 942 located at the right boundary of the picture (here after two horizontal binary partitionings).

Block 950 is located at a corner boundary and is partitioned using first recursive horizontal forced binary partitioning until a sub-partition or block, here block 952, is located at a bottom boundary of the picture (here after two horizontal binary partitionings) and then recursive partitioning the sub-partition by a vertical forced boundary partitioning until a leaf node or block, e.g. block 954, is located at the right boundary of the picture (here after two vertical binary partitionings), or respectively, until a leaf node is located inside the picture.

The approaches above may be applied to both decoding and encoding. For decoding, MinQTSize may be received via an SPS. For encoding, MinQTSize may be transmitted via an SPS. Embodiments may use boundary definitions as shown in FIG. 8 or FIG. 10, or other boundary definitions.

Further embodiments of the present disclosure are provided in the following. It should be noted that the numbering used in the following section does not necessarily need to comply with the numbering used in the previous sections.

Embodiment 1: A partitioning method comprising:

determining whether the current block of a picture is a boundary block;

if the current block is a boundary block, determining whether the size of the current block is larger than a minimum allowed quadtree leaf node size;

if the size of the current block is not larger than the minimum allowed quadtree leaf node size, applying forced binary tree partitioning to the current block.

Embodiment 2: The partitioning method of embodiment 1, wherein the forced binary tree partitioning is a recursive horizontal forced binary partitioning in case the current block is located on a bottom boundary of the picture, or is a recursive vertical forced boundary partitioning in case the current block is located on a right boundary of the picture.

Embodiment 3: The partitioning method of embodiment 1 or 2, wherein the forced binary partitioning comprises recursively partitioning the current block by a horizontal forced boundary partitioning until a sub-partition of the current block is located directly at the bottom boundary of the picture, and recursively partitioning the sub-partition by a vertical forced boundary partitioning until a leaf node is entirely located directly at the right boundary of picture, or vice versa.

Embodiment 4: The partitioning method of any of embodiments 1 to 3, wherein the minimum allowed quadtree leaf node size is a minimum allowed quadtree leaf node size also applied for controlling the partitioning of a non-boundary block.

Embodiment 5: A decoding method for decoding a block by partitioning the block according to the portioning method of any of embodiments 1 to 4.

Embodiment 6: The decoding method of embodiment 5, wherein the minimum allowed quadtree leaf node size is received via an SPS.

Embodiment 7: An encoding method for encoding a block by partitioning the block according to the portioning method of any of embodiments 1 to 4.

Embodiment 8: The encoding method of embodiment 7, wherein the minimum allowed quadtree leaf node size is transmitted via an SPS.

Embodiment 9: A decoding device, comprising a logic circuitry configured to perform any one of the methods of embodiment 5 or 6.

Embodiment 10: An encoding device, comprising a logic circuitry configured to perform any one of the method of embodiment 7 or 8.

Embodiment 11: A non-transitory storage medium for storing instructions when executed by a processor cause the processor to perform any of the methods according to embodiments 1 to 8.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which correspond to a tangible medium such as data storage media, or communication media including any medium that facilitates transfer of a computer program from one place to another, e.g., according to a communication protocol. In this manner, computer-readable media generally may correspond to (1) tangible computer-readable storage media which are non-transitory or (2) a communication medium such as a signal or carrier wave. Data storage media may be any available media that can be accessed by one or more computers or one or more processors to retrieve instructions, code, or data structures for implementation of the techniques described in this disclosure. A computer program product may include a computer-readable medium.

By way of example and not limitation, such computer-readable storage media can comprise RAM, ROM, electrically-erasable programmable read-only memory (EEPROM), CD-ROM, or other optical disk storage, magnetic disk storage, other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

An apparatus comprises a memory element; and a processor element coupled to the memory element and configured to determine whether a current block of a picture is a boundary block, determine, when the current block is a boundary block, whether a size of the current block is larger than a minimum allowed quadtree (QT) leaf node size (MinQTSize), and apply, when the size of the current block is not larger than MinQTSize, forced binary tree (BT) partitioning to the current block.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

| Definitions of Acronyms & Glossary: |
| --- |
| HEVC—High-Efficiency Video Coding |
| VVC—Versatile Video Coding |
| VTM—VVC Test Model |
| JEM—Joint Exploration Model |
| CTU—Coding Tree Unit |
| CU—Coding Unit |
| BT—Binary Tree |
| TT—Ternary Tree |
| QT—Quad Tree or Quaternary Tree |
| ABT—Asymmetric BT |
| MTT—Multi-type Tree |
| AMP—Asymmetric Partition |
| SH—Slice Header |
| SPS—Sequence Parameter Set |
| PPS—Picture Parameter Set |
| CE—Core Experiment |
| SubCE—SubCore Experiment (part of a Core Experiment) |

What is claimed is:

1. A method for encoding a current block of a picture, the method comprising:

determining the current block of the picture is a boundary block and that a size of the current block is less than or equal to a minimum allowed quadtree (QT) leaf node size (MinQTSize) parameter;

in response to the determining, applying forced binary tree (BT) partitioning to the current block, wherein the boundary block is located at a corner boundary, and wherein applying the forced BT partitioning comprises:

recursively partitioning the current block by a horizontal forced boundary partitioning until a sub-partition of the current block is located at a bottom boundary of the picture; and recursively partitioning the sub-partition by a vertical forced boundary partitioning until a leaf node is located at a right boundary of the picture; and generating a bitstream comprising the current block encoded based on applying the forced BT partitioning.

2. The method of claim 1, further comprising applying the MinQTSize parameter for controlling partitioning of a non-boundary block of the picture.

3. The method of claim 1, further comprising transmitting the MinQTSize parameter via a sequence parameter set (SPS).

4. An encoding apparatus, the encoding apparatus comprising:

a memory storing instructions; and a processor coupled to the memory and configured to execute the instructions to:

determine that a current block of a picture is a boundary block and that a size of the current block is larger than a minimum allowed quadtree (QT) leaf node size (MinQTSize) parameter;

in response to the determining, apply forced binary tree (BT) partitioning to the current block, wherein the boundary block is located at a corner boundary, and wherein applying the forced BT partitioning comprises:

recursively partitioning the current block by a horizontal forced boundary partitioning until a sub-partition of the current block is located at a bottom boundary of the picture; and recursively partitioning the sub-partition by a vertical forced boundary partitioning until a leaf node is located at a right boundary of the picture; and generate a bitstream comprising the current block encoded based on applying the forced BT partitioning.

5. The encoding apparatus of claim 4, wherein the processor is further configured to execute the instructions to apply the MinQTSize parameter for controlling partitioning of a non-boundary block of the picture.

6. The encoding apparatus of claim 4, further comprising:

a transmitter coupled to the processor, wherein the transmitter is configured to transmit the MinQTSize parameter via a sequence parameter set (SPS).

7. A non-transitory computer-readable storage medium storing a computer program product comprising computer executable instructions that, when executed by a processor, cause an encoding apparatus to:

determine that a current block of a picture is a boundary block and that a size of the current block is larger than a minimum allowed quadtree (QT) leaf node size (MinQTSize) parameter;

in response to the determining, apply forced binary tree (BT) partitioning to the current block, wherein the boundary block is located at a corner boundary, and wherein applying the forced BT partitioning comprises:

recursively partitioning the current block by a horizontal forced boundary partitioning until a sub-partition of the current block is located at a bottom boundary of the picture; and recursively partitioning the sub-partition by a vertical forced boundary partitioning until a leaf node is located at a right boundary of the picture; and generate a bitstream comprising the current block encoded based on applying the forced BT partitioning.

8. The non-transitory computer-readable storage medium of claim 7, wherein the processor executing the instructions further causes the apparatus to apply the MinQTSize parameter for controlling partitioning of a non-boundary block of the picture.

9. The non-transitory computer-readable storage medium of claim 7, wherein the processor executing the instructions further causes the apparatus to transmit the MinQTSize parameter via a sequence parameter set (SPS).

* * * * *